US012583112B2

(12) United States Patent (10) Patent No.: US 12,583,112 B2
Jinandra et al. (45) Date of Patent: Mar. 24, 2026

(54) MOTION PLANNING TECHNIQUE FOR ROBOTIC SYSTEMS

(71) Applicant: Bastian Solutions, LLC, Indianapolis, IN (US)

(72) Inventors: Akash Madhu Jinandra, Boise, ID (US); Stephen Daniel Earl, Boise, ID (US); Dylan Rolleigh, Boise, ID (US); Wankun Sirichotiyakul, Boise, ID (US); Scott Alan Laue, Carrollton, TX (US)

(73) Assignee: Bastian Solutions, LLC, Indianapolis, IN (US)

( * ) Notice: Subject to any disclaimer, the term of this patent is extended or adjusted under 35 U.S.C. 154(b) by 139 days.

(21) Appl. No.: 18/484,480

(22) Filed: Oct. 11, 2023

(65) Prior Publication Data

US 2025/0123623 A1 Apr. 17, 2025

(51) Int. Cl.
*B25J 9/16* (2006.01)
*B66F 9/06* (2006.01)

(52) U.S. Cl.
CPC ........... *B25J 9/1664* (2013.01); *B25J 9/1669* (2013.01); *B25J 9/1679* (2013.01); *B25J 9/1697* (2013.01); *B66F 9/063* (2013.01)

(58) Field of Classification Search
CPC ...... B25J 9/1669; B25J 9/1661; B25J 9/1664; B25J 9/1666; B25J 9/1679; B25J 9/1687; B25J 9/1694; B25J 9/1697; B66F 9/063
See application file for complete search history.

(56) References Cited

U.S. PATENT DOCUMENTS

| | | | |
|---|---|---|---|
| 9,561,587 B2 | 2/2017 | Wellman et al. | |
| 10,621,402 B2 | 4/2020 | Wagner et al. | |
| 10,815,075 B2 | 10/2020 | Bastian et al. | |
| 11,203,116 B2 | 12/2021 | Demirdjian et al. | |
| 11,209,447 B2 | 12/2021 | Pollack et al. | |
| 11,254,518 B2 | 2/2022 | Bastian, II et al. | |
| 11,305,935 B2 | 4/2022 | Blotnik et al. | |
| 11,518,630 B2 | 12/2022 | Zoghzoghy et al. | |
| 2014/0121836 A1* | 5/2014 | Ban ........................ B25J 9/0093 700/259 |
| 2020/0242544 A1* | 7/2020 | Galluzzo ................ B25J 9/1692 |
| 2021/0016454 A1 | 1/2021 | Jeong et al. | |
| 2021/0122039 A1 | 4/2021 | Su et al. | |
| 2021/0122586 A1 | 4/2021 | Sun et al. | |
| 2021/0146531 A1 | 5/2021 | Tremblay et al. | |

(Continued)

FOREIGN PATENT DOCUMENTS

WO 2020237367 A1 12/2020

*Primary Examiner* — Spencer D Patton
(74) *Attorney, Agent, or Firm* — Woodard, Emhardt, Henry, Reeves & Wagner, LLP

(57) ABSTRACT

A system includes a camera, a robot, and a management system. The camera is configured to capture one or more images of a material handling environment. The material handling environment normally includes one or more items. The robot is at least in part configured to move along a travel path relative to the items, and the robot is configured to pick the items. The management system is configured to monitor the material handling environment through the images from the camera. The management system is configured to determine dynamically multiple picking solutions for the items in real-time while the robot moves along the travel path.

19 Claims, 9 Drawing Sheets

(56)                    References Cited

U.S. PATENT DOCUMENTS

| | | | |
|---|---|---|---|
| 2021/0229275 A1 | 7/2021 | Komaike | |
| 2021/0365032 A1* | 11/2021 | Ichnowski | G06N 3/045 |
| 2023/0182315 A1* | 6/2023 | Merkle | B25J 9/1669 |
| | | | 700/259 |
| 2023/0368414 A1* | 11/2023 | Afrooze | G06N 3/08 |
| 2024/0279008 A1* | 8/2024 | McCalib, Jr. | B25J 9/0084 |

* cited by examiner

700

800

Moving an end effector along a path using a robot — 805

Monitoring the pick environment using a camera — 810

Determining a picking solution — 815

Updating the path towards the picking solution — 820

MOTION PLANNING TECHNIQUE FOR ROBOTIC SYSTEMS

BACKGROUND

Robots are utilized in material handling and manufacturing facilities to automate various tasks. For example, a material handling facility can utilize robots to perform tasks related to storage, inventory management, manufacturing, fulfilling orders, and/or other purposes. Software and/or firmware in the robot is typically used to provide instructions that are used to guide the movements of the robot. In some cases, the robot can operate inefficiently or undesirably if the control instructions or code is less than optimal.

Thus, there is a need for improvement in this field.

SUMMARY

System uptime is always a concern in automated material handling systems. In many cases, materials can be arranged in an unpredictable way in such facilities, such as items arranged in varying patterns, items completely disorganized in a receptacle, and/or a receptacle including items with various shapes and sizes. Robotic equipment can struggle to handle materials that are arranged unpredictably, causing increased downtime and reducing system efficiency. Particularly, it may be difficult or impossible to handle such materials using robotic equipment that operates based on pre-programmed software and/or firmware instructions. For example, robotic equipment may require multiple attempts to pick an item based on hard-coded control instructions. In another example, the robotic equipment may not be capable of picking an item in one arrangement and may require intervention from a human operator. In such cases, the system may need to disable the robotic equipment for a period of time, further increasing system downtime. In other cases, the robotic equipment may have difficulty placing or arranging items in a bin, pallet, or other storage device/container. For example, items on a pallet may topple off the pallet if the robotic equipment does not stack the items properly. When that occurs, a human operator may need to intervene to remedy the situation which in turn impacts downtime.

A unique robotic motion planning system and method have been developed that is adaptable to a wide variety of applications. For instance, the robotic motion planning system is configured to facilitate bin picking/placing, depalletizing, and trailer loading/unloading, to name just a few. The robotic system plans the motions of a robotic arm on-the-fly. In other words, the movement of the robotic arm is not pre-programmed or hard-coded. In this way, the robotic system is adaptable to handle many different types and arrangements of items.

The robotic system has a camera that monitors picking or other environments in real-time. In one form, one or more cameras are mounted on the robotic arm. The robotic arm uses a vision system with artificial intelligence (AI) feedback to plan paths for picking and/or placing items until the particular task is complete. In one form, the robotic system determines a unique travel path for each pile of items. The cameras can be mounted or located elsewhere, for example to view the entire robotic arm and picking environment. As the robotic arm moves, the robotic system checks for position/orientation or otherwise monitors items along the travel path. In some cases, the travel path has an irregular shape. To an outside viewer, the travel path may appear to randomly change based on the feedback from the AI system. In some rare cases, such as when the camera is mounted on the robotic arm, the robotic arm may at least initially travel along a travel path that has a predefined or regular shape, like an orbital or spiral path, so as to capture an initial view of the items which is then processed by the AI system to plan the subsequent travel paths for picking and/or placing the items. Once this initial defined scanning path is completed, the robotic arm then travels based on the AI feedback.

During this process, the robotic system determines dynamically multiple picking solutions in real-time. As some examples, the picking solutions can include picking an item, repositioning the robotic arm towards an item, and/or reorienting an end effector or end of arm tool (EoAT) on the robotic arm. The robotic system ranks multiple picking movement options and picking targets, and the robotic system selects the picking movement and/or target item with the highest rank. The ranking can be based on a number of factors. For instance, the ranking can be based on the relative visibility of each remaining item to be picked. Ranking can also be based on the location of each remaining item relative to an ideal picking point. Each remaining item can be further ranked based on the relative position of the item to the top of the pile of items. For instance, items on the top of a stack or pile are ranked higher than those at the bottom. The ranking can also incorporate the extent to which the visibility of each item is occluded by the remaining items. Items that are more readily visible are ranked higher as potential picking targets.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a network.

Aspect 3 generally concerns the system of any previous aspect including a computer.

Aspect 4 generally concerns the system of any previous aspect in which the computer operatively coupled to the network.

Aspect 5 generally concerns the system of any previous aspect in which the computer configured to provide an interface for a human operator.

Aspect 6 generally concerns the system of any previous aspect including a camera.

Aspect 7 generally concerns the system of any previous aspect in which the camera is operatively coupled to the network.

Aspect 8 generally concerns the system of any previous aspect in which the camera is configured to capture one or more images of a material handling environment.

Aspect 9 generally concerns the system of any previous aspect in which the camera is configured to monitor the material handling environment in real-time.

Aspect 10 generally concerns the system of any previous aspect in which the material handling environment includes items.

Aspect 11 generally concerns the system of any previous aspect in which the material handling environment includes a tote in which the items are contained.

Aspect 12 generally concerns the system of any previous aspect in which the items are arranged in a pile within the tote.

Aspect 13 generally concerns the system of any previous aspect in which the material handling environment includes a pallet on which the items are stacked.

Aspect 14 generally concerns the system of any previous aspect in which the items are stacked up one another on the pallet.

Aspect 15 generally concerns the system of any previous aspect in which the material handling environment includes a trailer in which the items are housed.

Aspect 16 generally concerns the system of any previous aspect in which the items are stacked within the trailer.

Aspect 17 generally concerns the system of any previous aspect in which the camera includes a camera controller.

Aspect 18 generally concerns the system of any previous aspect in which the camera controller is operatively coupled to the network.

Aspect 19 generally concerns the system of any previous aspect including a robot.

Aspect 20 generally concerns the system of any previous aspect in which the robot is operatively coupled to the network.

Aspect 21 generally concerns the system of any previous aspect in which the robot is configured to handle the items.

Aspect 22 generally concerns the system of any previous aspect in which the robot is configured to move relative to the items to pick the items.

Aspect 23 generally concerns the system of any previous aspect in which the robot at least in part is configured to move along a travel path relative to the items.

Aspect 24 generally concerns the system of any previous aspect in which the movement of the robot is not pre-programmed.

Aspect 25 generally concerns the system of any previous aspect in which the robot is configured to pick the items.

Aspect 26 generally concerns the system of any previous aspect in which the robot is a robot arm.

Aspect 27 generally concerns the system of any previous aspect in which the robot is a robotic shuttle.

Aspect 28 generally concerns the system of any previous aspect in which the robot is a robotic mast vehicle.

Aspect 29 generally concerns the system of any previous aspect in which the camera is a robot camera mounted on the robot.

Aspect 30 generally concerns the system of any previous aspect in which the camera is an environment camera.

Aspect 31 generally concerns the system of any previous aspect in which the environment camera is positioned to view the material handling environment.

Aspect 32 generally concerns the system of any previous aspect in which the robot includes an end effector configured to engage the items.

Aspect 33 generally concerns the system of any previous aspect in which the end effector is configured to pick the items.

Aspect 34 generally concerns the system of any previous aspect in which the robot includes a robot controller.

Aspect 35 generally concerns the system of any previous aspect in which the robot controller is operatively coupled to the network.

Aspect 36 generally concerns the system of any previous aspect in which the robot controller and the camera controller are integrated to form a single unit.

Aspect 37 generally concerns the system of any previous aspect in which the robot controller is configured to control movement of the robot.

Aspect 38 generally concerns the system of any previous aspect in which the robot controller is configured to instruct the robot to move along the travel path.

Aspect 39 generally concerns the system of any previous aspect in which the travel path has an irregular shape.

Aspect 40 generally concerns the system of any previous aspect in which the travel path has a regular shape.

Aspect 41 generally concerns the system of any previous aspect in which the travel path is shaped to ensure mechanical stability of the pile of the items once at least one of the items is removed from the pile.

Aspect 42 generally concerns the system of any previous aspect in which the robot is configured to pick and/or place the items.

Aspect 43 generally concerns the system of any previous aspect in which the robot is configured to palletize and/or depalletize the items.

Aspect 44 generally concerns the system of any previous aspect in which the camera is configured to capture one or more images of the items as the robot moves along the travel path.

Aspect 45 generally concerns the system of any previous aspect in which the camera is configured to monitor the material handling environment.

Aspect 46 generally concerns the system of any previous aspect in which the material handling environment includes the robot.

Aspect 47 generally concerns the system of any previous aspect including a management system.

Aspect 48 generally concerns the system of any previous aspect in which the management system is operatively coupled to the network.

Aspect 49 generally concerns the system of any previous aspect in which the management system is configured to communicate with the robot.

Aspect 50 generally concerns the system of any previous aspect in which the management system is configured to communicate with the camera.

Aspect 51 generally concerns the system of any previous aspect in which the management system is configured to determine movement of the robot.

Aspect 52 generally concerns the system of any previous aspect in which the management system is configured to determine movement of the robot through the images from the camera.

Aspect 53 generally concerns the system of any previous aspect in which the management system is configured to plan a picking location for the robot.

Aspect 54 generally concerns the system of any previous aspect in which the management system is configured to monitor the material handling environment.

Aspect 55 generally concerns the system of any previous aspect in which the management system is configured to monitor the material handling environment through the images from the camera.

Aspect 56 generally concerns the system of any previous aspect in which the management system is configured to check position of the items as the robot moves along the travel path.

Aspect 57 generally concerns the system of any previous aspect in which the management system is configured to plan one or more picking locations of the items for the robot.

Aspect 58 generally concerns the system of any previous aspect in which the management system is configured to rank multiple picking location options for the items.

Aspect 59 generally concerns the system of any previous aspect in which the management system is configured to select a picking location option with highest rank.

Aspect 60 generally concerns the system of any previous aspect in which the rank includes relative visibility of each remaining item.

Aspect 61 generally concerns the system of any previous aspect in which the rank includes location of each remaining item relative to an ideal picking point.

Aspect 62 generally concerns the system of any previous aspect in which the rank includes location of each remaining item relative to a top of pile of items.

Aspect 63 generally concerns the system of any previous aspect in which the rank includes extent the visibility of each item is occluded by the remaining items.

Aspect 64 generally concerns the system of any previous aspect in which the management system checks for position of the items along the travel path of the robot as the robot moves.

Aspect 65 generally concerns the system of any previous aspect in which the management system is configured to determine dynamically multiple picking solutions for the items in real-time while the robot moves along the travel path.

Aspect 66 generally concerns the system of any previous aspect in which the management system includes an artificial intelligence (AI) system.

Aspect 67 generally concerns the system of any previous aspect in which the AI system is configured to identify the items.

Aspect 68 generally concerns the system of any previous aspect in which the AI system is configured to identify one or more pick points on the items.

Aspect 69 generally concerns the system of any previous aspect in which the AI system is configured to determine the location of the items.

Aspect 70 generally concerns the system of any previous aspect in which the AI system is configured to determine the orientation of items.

Aspect 71 generally concerns the system of any previous aspect in which the AI system is configured to determine the travel path of the robot.

Aspect 72 generally concerns the system of any previous aspect in which the AI system is configured to determine dynamically multiple picking solutions for the items in real-time while the robot moves along the travel path.

Aspect 73 generally concerns the system of any previous aspect in which the management system, the robot controller, and the camera controller are integrated into a single unit.

Aspect 74 generally concerns the system of any previous aspect in which the management system, the robot controller, and the camera controller are integrated into the robot.

Aspect 75 generally concerns the system of any previous aspect in which the AI system is integrated into the robot.

Aspect 76 generally concerns the system of any previous aspect in which the AI system is integrated into the robot controller.

Aspect 77 generally concerns the system of any previous aspect in which the AI system is integrated into the camera controller.

Aspect 78 generally concerns the system of any previous aspect in which the management system is configured to check position of the items as the robot moves along the travel path through images from the camera.

Aspect 79 generally concerns the system of any previous aspect in which the shape of the travel path is based on how the items are arranged.

Aspect 80 generally concerns a method.

Aspect 81 generally concerns the method of any previous aspect including monitoring a material handling environment using a camera.

Aspect 82 generally concerns the method of any previous aspect including moving an end effector of a robot relative to the items along a travel path.

Aspect 83 generally concerns the method of any previous aspect including processing the images from the camera with a management system.

Aspect 84 generally concerns the method of any previous aspect including
determining a picking solution for a target item in the items with the management system during the moving of the end effector.

Aspect 85 generally concerns the method of any previous aspect including picking the target item with the end effector of the robot.

Aspect 86 generally concerns the method of any previous aspect including ranking multiple picking solutions for the items with the management system.

Aspect 87 generally concerns the method of any previous aspect in which the determining the picking solution includes selecting the target item based on the ranking.

Aspect 88 generally concerns the method of any previous aspect in which the picking solution of the target item has the highest rank.

Aspect 89 generally concerns the method of any previous aspect in which the ranking includes determining relative visibility of each of the items.

Aspect 90 generally concerns the method of any previous aspect in which the ranking includes locating each the items relative to an ideal picking point.

Aspect 91 generally concerns the method of any previous aspect in which the ranking includes locating each of the items relative to a top of a pile of the items.

Aspect 92 generally concerns the method of any previous aspect in which the ranking includes determining visibility of each of the items.

Aspect 93 generally concerns the method of any previous aspect including updating the travel path of the robot towards the target item.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
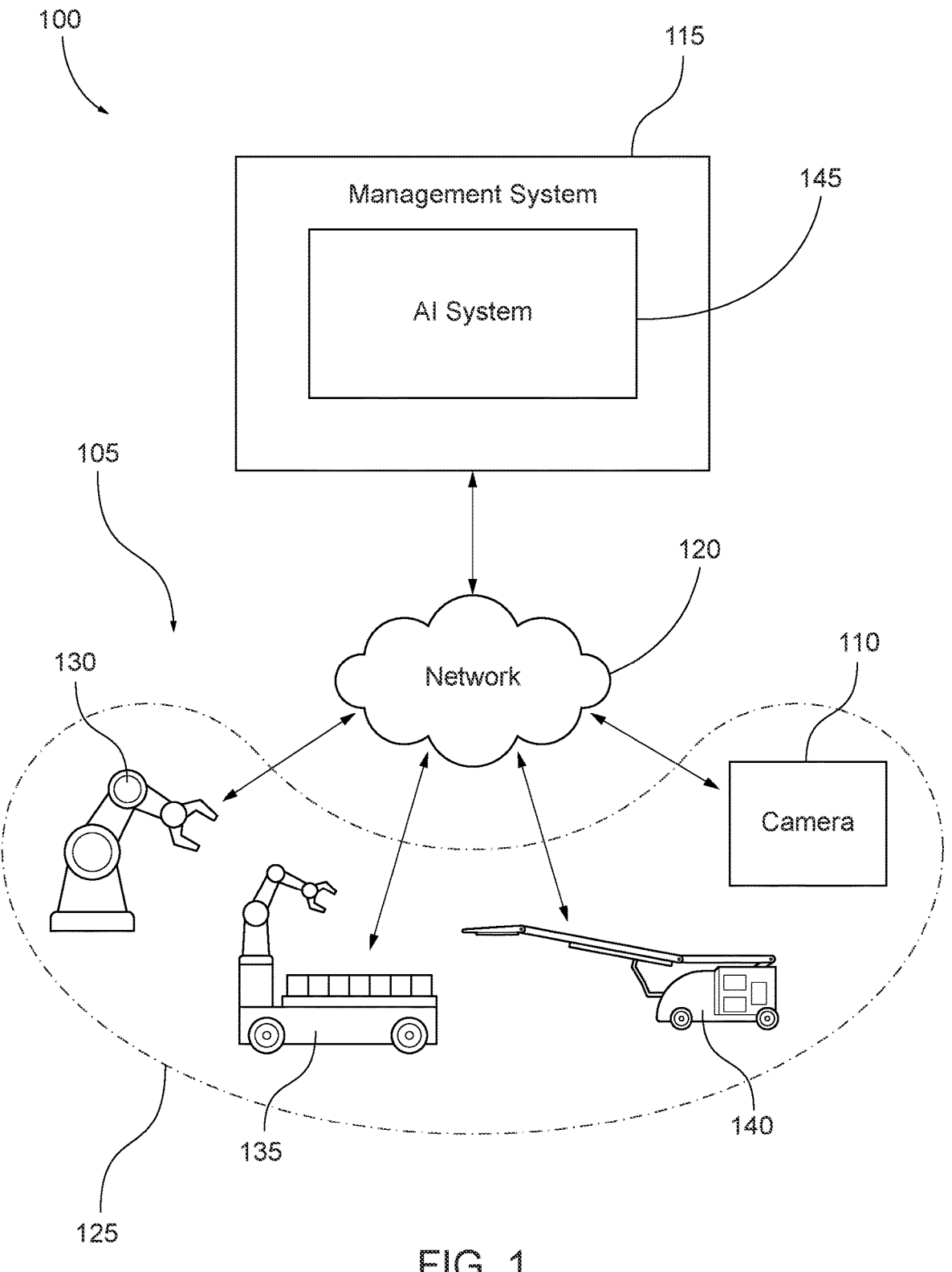
FIG. 1 is a block diagram of a motion planning system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a block diagram of a motion planning system 100 according to one example. The motion planning system 100 is designed to plan the movement and determine other operations of one or more robots 105. Typically, the motion planning system 100 is utilized to guide robots 105 in a material handling facility, such as in a warehouse, order fulfillment center, or manufacturing plant. In addition to the robots 105, the motion planning system 100 includes at least one camera 110 and a management system 115. The robots 105, camera 110, and management system 115 are communicatively coupled through a network 120. The network 120 can include wired, wireless, or a combination of such connections. In one example, the network 120 includes a local network that connects to devices within one building or facility. In an alternate example, the network 120 may extend outside of one building using a cellular network, the Internet, and/or another external network.

The robots 105 are generally configured to move and handle items for a variety of material handling purposes. As examples, the robots 105 can perform processes such as picking items from a tote, placing items into a tote, rearranging items, stacking/unstacking items on a pallet, and/or loading/unloading items in a trailer. The robots 105 are configured to handle a variety of types of items, including bags, boxes, parcels, cartons, packages, bottles, cans, and/or other objects. Similarly, the robots 105 can include a variety of types of robot. As illustrated, the robots 105 of the FIG. 1 example include a robot arm 130, a robotic shuttle 135, and a robotic mast vehicle 140. The robot arm 130 can be used to pick and place items for order fulfillment as one example. The robotic shuttle 135 can be used in automated storage and retrieval systems as one example, and the robotic mast vehicle 140 is typically used to load and unload trailers. The robotic shuttle 135 and robotic mast vehicle 140 are each in the form of an autonomous mobile unit (AMU) that is able to independently move and handle items. As should be appreciated, the robots 105 can include any combination of robot types and/or other types of robots, such as a gantry style robot, a robotic forklift, and/or another type of robot.

The camera 110 is configured to monitor the robots 105 and/or other parts of a facility, such as conveyors, shelving, loading docks, vehicles, and/or other equipment. As noted, the camera 110 is communicatively coupled to the network 120. Using the network 120, camera 110 is configured to send image data to the robots 105, management system 115, and/or another device. In one example, each robot 105 has one or more cameras 110 integrated into the robot 105 and/or positioned proximal to the working area of the robot 105. The camera 110 may include a variety of camera types, such as an RGB, infrared, and/or 3D camera to name a few. In one example, the motion planning system 100 may include multiple cameras 110 to provide multiple views of an object and/or views of multiple parts of a facility. In another example, the camera 110 processes captured image data before sending the data to other parts of the motion planning system 100. As should be recognized, image data captured by the camera 110 can include individual still images and/or multiple images in the form of video.

The management system 115 is configured to control the operations of the motion planning system 100. For example, the management system 115 may receive data over the network 120, determine an action based on the data, and send commands to the robots 105 or other devices using the network 120. Further, the management system 115 is generally configured to process data, perform algorithms, store data, and/or perform other tasks. The management system 115 includes one or more computers to perform such tasks.

The management system 115 includes an artificial intelligence system 145 that is configured to perform a variety of tasks related to material handling. In one embodiment, the artificial intelligence system 145 is trained to perform a variety of computer vision tasks, such as identifying an object, tracking the position of an object, and/or determining the shape of an object. In another example, the artificial intelligence system 145 is trained to generate commands for the robot 105, such as commands for moving a portion of the robot 105, changing the orientation of a portion of the robot 105, picking an object, and/or placing an object. In one example, the artificial intelligence system 145 may utilize a machine learning algorithm to train a neural network to perform such tasks. The artificial intelligence system 145 may utilize one or more types of neural networks, such as a convolutional neural network, a recurrent neural network, generative neural network, discriminative neural network, and/or another type of neural network. Typically, the artificial intelligence system 145 analyzes image data that is captured by the camera 110; although, the artificial intelligence system 145 may utilize information from other sensors or sources. As should be further appreciated, the artificial intelligence system 145 can be implemented on another device within the motion planning system 100, such as on the robots 105 or on another computer.

A material handling environment 125 is designated within a facility or other building to denote the area where the robots 105, camera 110, and/or other devices operate. In one example, the material handling environment 125 encompasses conveyors, platforms, and/or shelving that are used with the robot arm 130. In another example, the material handling environment 125 encompasses barriers, shelving, and/or storage structures that are used with the robotic shuttle 135. In yet another example, the material handling environment 125 encompasses a loading dock and a trailer that are used with the robotic mast vehicle 140. The material handling environment 125 can further encompass items, totes, and/or other objects that the robot 105 is configured to handle. In relation to the material handling environment 125, the camera 110 is positioned such that at least a portion of the material handling environment 125 is in view of the camera 110. In one embodiment, the camera 110 is located outside of the material handling environment 125. In another embodiment, the camera 110 is positioned to view the entire material handling environment 125.

Figure 2:
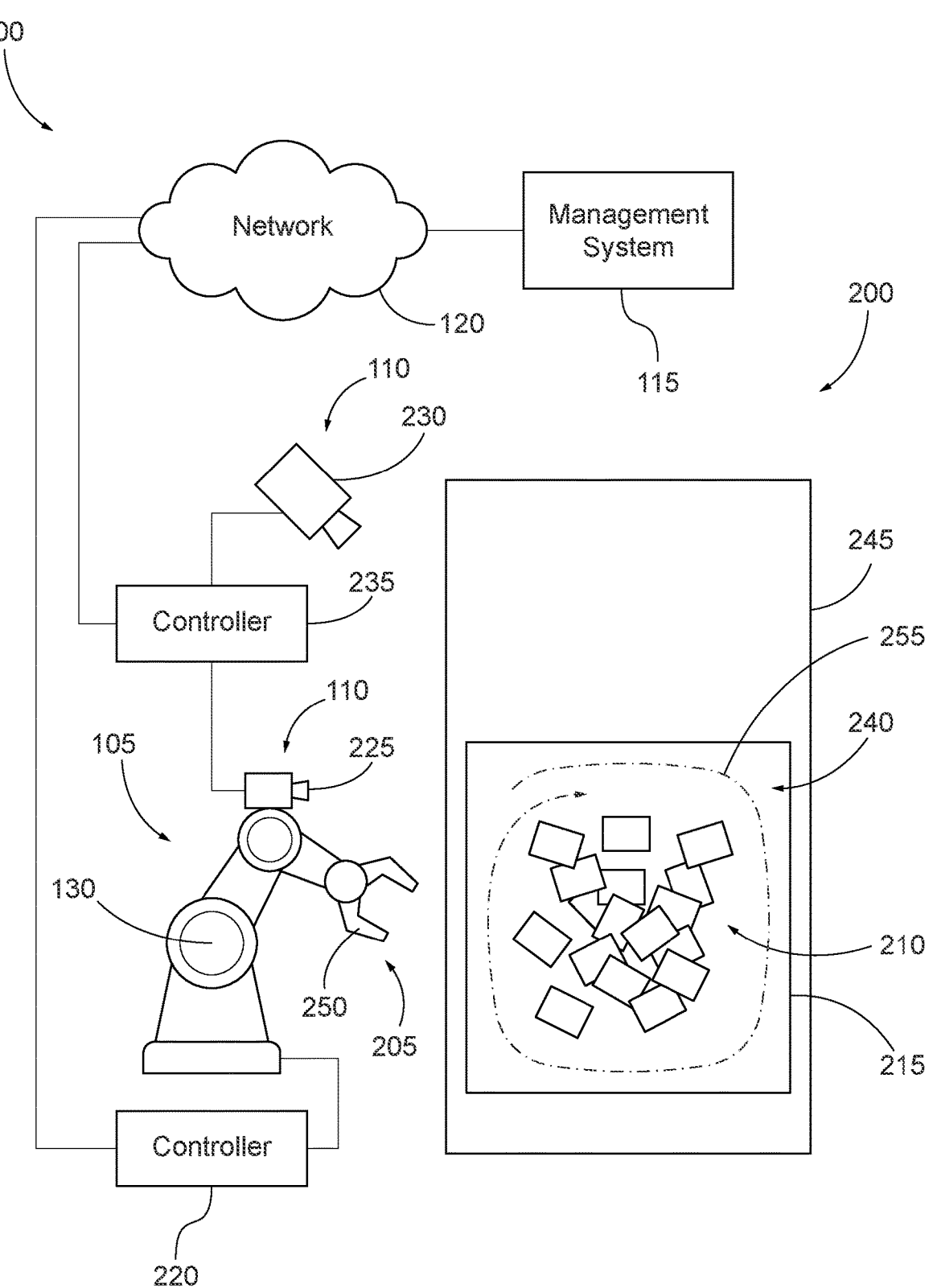
FIG. 2 is a diagram of the FIG. 1 motion planning system operating at a picking station.

FIG. 2 depicts one example of a picking station 200 where the robot 105 operates. In the illustrated example, the robot 105 is the robot arm 130. Nevertheless, it should be recognized that the picking station 200 could include another type of robot, such as one of the robots 105 shown in FIG. 1 or another type of robot. As illustrated, the robot arm 130 includes an end effector 205. The end effector 205 is configured to interact with objects to perform various types of material handling tasks. Typically, but not always, the end effector 205 is specialized to grab, attract, and/or couple to objects to perform such tasks. In one example, the robot 105 includes multiple types of end effectors 205.

At the picking station 200, the robot arm 130 is configured to pick one or more items 210 from a tote 215. In one example, the robot arm 130 is also configured to place and/or rearrange items 210 in the tote 215. The tote 215 can include just one type or a variety of types of item 210. For example, the items 210 at the picking station 200 can include packets, parcels, cartons, bottles, cans, bags, and/or other objects. Similarly, the picking station 200 can include one or more types of tote 215, such as a basket, tub, box, tray, container, and/or another structure to support items 210.

As shown, a robot controller 220 is connected to the robot 105. The robot controller 220 is configured to communicate with the robot 105 and with other parts of the motion planning system 100 over the network 120. For example, the robot controller 220 may send and/or receive commands, equipment statuses, visual data, and/or other information. In one embodiment, the robot controller 220 is integrated with the robot 105. For example, the robot controller 220 can be contained within a portion of a housing of the robot 105. The robot controller 220 is configured to perform computational tasks related to the operation of the robot 105, such as storing algorithms, processing data, transmitting instructions, and/or other tasks. In one example, the robot controller 220 may determine commands for the robot 105 based on data received over the network 120. In another example, the robot controller 220 may control the robot 105 based on commands determined by the management system 115.

In the illustrated example, the camera 110 includes a robot camera 225 that is mechanically coupled to the robot 105. The robot camera 225 is positioned to capture image data of the robot 105. In one example, the robot camera 225 is mounted near or on the end effector 205 such as to more directly view the end effector 205 compared to another camera 110. For example, image data captured by the robot camera 225 may have more information about the position and/or orientation of the end effector 205 compared to another camera 110. In another example, the robot camera 225 provides a more direct view of the items 210 compared to another camera 110 such that the end effector 205 can more precisely interact with the items 210 based on the image data. Moreover, the robot camera 225 may include multiple cameras to provide multiple viewpoints on the robot 105.

In addition to the robot camera 225, the camera 110 includes an environment camera 230 in the FIG. 2 example. The environment camera 230 is positioned to capture a broad view of the material handling environment 125. For example, the environment camera 230 may capture an image containing the robot 105, items 210, and tote 215. In one embodiment, the environment camera 230 is mounted to a structure or equipment positioned outside the material handling environment 125. In this way, the environment camera 230 can remotely view the operations within the material handling environment 125. In one example, the environment camera 230 captures views of the robot 105 and/or the items 210 such as to provide information about the position and/or orientation of all parts of the robot 105 and/or all the items 210 in the tote 215.

The motion planning system 100 further includes a camera controller 235 that is connected to the cameras 110. The camera controller 235 is configured to communicate with the cameras 110 and with other parts of the motion planning system 100 over the network 120. For example, the camera controller 235 may send and/or receive commands, equipment statuses, visual data, and/or other information. In one embodiment, one camera controller 235 is connected to each camera 110. In another embodiment, the camera controller 235 is integrated in the same housing as the robot camera 225 and/or environment camera 230. In still yet another embodiment, the management system 115, artificial intelligence system 145, robot controller 220, and/or the robot camera 225 are integrated together in a single unit within the robot 105. The camera controller 235 is configured to perform computational tasks related to the operation of the cameras 110. In one example, the camera controller 235 may process image data captured by one or more cameras 110. In another example, the environment camera 230 may change a camera setting or alter the view of the cameras 110 based on communications from the management system 115.

The motion planning system 100 is configured to determine a path 240 for the robot 105 to travel along in order to begin a material handling task. For example, the management system 115 may determine the path 240 for the robot 105 to move along. The path 240 defines a series of three-dimensional positions for a portion of the robot 105, such as the end effector 205. In one embodiment, the path 240 is substantially defined in two dimensions with a constant or nearly constant position in one direction. In one embodiment, the path 240 is not pre-programmed on any of the devices of the motion planning system 100. The management system 115 is configured to determine the path 240 in real time based on the type, arrangement, and/or number of items 210. The management system 115 may additionally consider other factors, such as the type and/or shape of the robot 105, end effector 205, tote 215, and/or another object located in the material handling environment 125. As should be appreciated, the robot controller 220, camera controller 235, and/or another device may determine the path 240. In one example, the artificial intelligence system 145 is trained to determine the path 240 uniquely for each material handling scenario. In another example, the artificial intelligence system 145 is trained to determine the path 240 based on images of the material handling environment 125 that are captured by the camera 110.

The robot 105 is further configured to move the end effector 205 along the path 240. The cameras 110 are configured to monitor the material handling environment 125 as the end effector 205 travels along the path 240. Based on image data from the cameras 110, the management system 115 is configured to identify items 210 near the path 240, check the position of such items 210, and/or monitor the items 210 in another way. Moreover, the management system 115 is configured to determine one or more picking solutions in real time. The picking solutions include movements for the end effector 205 to pick an item 210 and/or movements for the robot 105 to position and/or orient the end effector 205 in order to prepare for a pick. In one embodiment, the management system 115 is configured to make changes to the path 240 after a picking solution is determined and/or performed by the robot 105. In one example, the artificial intelligence system 145 is trained to generate the picking solutions and/or the updates to the path 240. As should be appreciated, the robot controller 220, camera controller 235, and/or another device may perform such actions instead of or in addition to the management system 115. Further, other parts of the robot 105 and/or the entire robot 105 may travel along the path 240. For example, the robotic shuttle 135 shown in FIG. 1 may move as a whole along the path 240.

In the FIG. 2 example, the picking station 200 includes a conveyor 245 that transports the tote 215 and items 210 to the robot arm 130. In one embodiment, the picking station 200 includes multiple conveyors 245. For example, one conveyor 245 may carry a tote 215 for the robot arm 130 to pick items 210 and another conveyor 245 may carry a tote 215 for the robot arm 130 to place items 210. The end effector 205 includes a picking tool 250 that is configured to perform picking and/or placing operations at the picking station 200. The picking tool 250 is configured grab or couple to one or more items 210. In the illustrated example, the picking tool 250 includes mechanical grippers. In another example, the picking tool 250 can include vacuum cups, electromagnets, and/or another type of tool. In one embodiment, the picking tool 250 is configured to pick one or more specific types of items 210.

At the picking station 200, the path 240 includes a picking path 255. The picking path 255 defines positions for the picking tool 250 and/or another part of the robot arm 130 to travel around the items 210 in the tote 215. As illustrated, the items 210 are generally arranged in a random pile within the tote 215. In one version, the picking path 255 is shaped to ensure mechanical stability of the pile of the items 210 once at least one of the items 210 is removed from the pile. In most cases, the picking path 255 has an irregular shape, such as an irregular zigzag pattern, but occasionally, the picking path 255 may have a regular shape such as a circular or spiral pattern.

In the FIG. 2 example, the robot arm 130 is configured to move the picking tool 250 along the picking path 255. The management system 115 is configured to analyze the position, orientation, shape, and/or other details of the items 210 to determine picking solutions for the robot arm 130 using the picking tool 250. In one embodiment, the management system 115 is configured to rank multiple picking options and select the option with the highest rank. For example, the ranking can include the visibility of each item in the tote 215. The visibility of the items 210 is lowered based on an obscured view from the camera 110, blurry image captured by the camera 110, and/or other such factors. Lower visibility can limit the ability of the management system 115 to identify sufficient details of the items 210 from the images and may reduce the quality of the picking solutions. In one example, a portion of the robot 105, tote 215, and/or other equipment can be positioned between an item 210 and the camera 110 such that the view of the item 210 is obstructed. In another example, the lighting conditions in the picking station 200 and/or the reflectivity of an item 210 can cause glare, blur, and/or other obstructions in the captured images. In yet another example, the ranking includes the extent that the visibility of each item 210 is obstructed by the other items 210 in the tote 215.

In one embodiment, the ranking includes the location of each item 210 in relation to an ideal picking point. For instance, the management system 115 may determine an ideal location for a hypothetical picking solution and then rank other picking options based on the distance to that location. As another example, the management system 115 may determine an ideal picking option based on an initial ranking and/or other considerations and then subsequently rank other picking options based on distance to the location of the ideal picking option. In another embodiment, the ranking includes the position of each item 210 relative to a top of the pile of items 210. For instance, the management system 115 may identify the three-dimensional positions of the items 210 and determine which item 210 is positioned furthest in an upward direction. Alternatively, the management system 115 may identify the top of the pile based on an item 210 that is not covered by other items 210. As should be recognized, the robot controller 220, camera controller 235, and/or another device may determine and rank the picking solutions and may use the artificial intelligence system 145 for such tasks.

Figure 3:
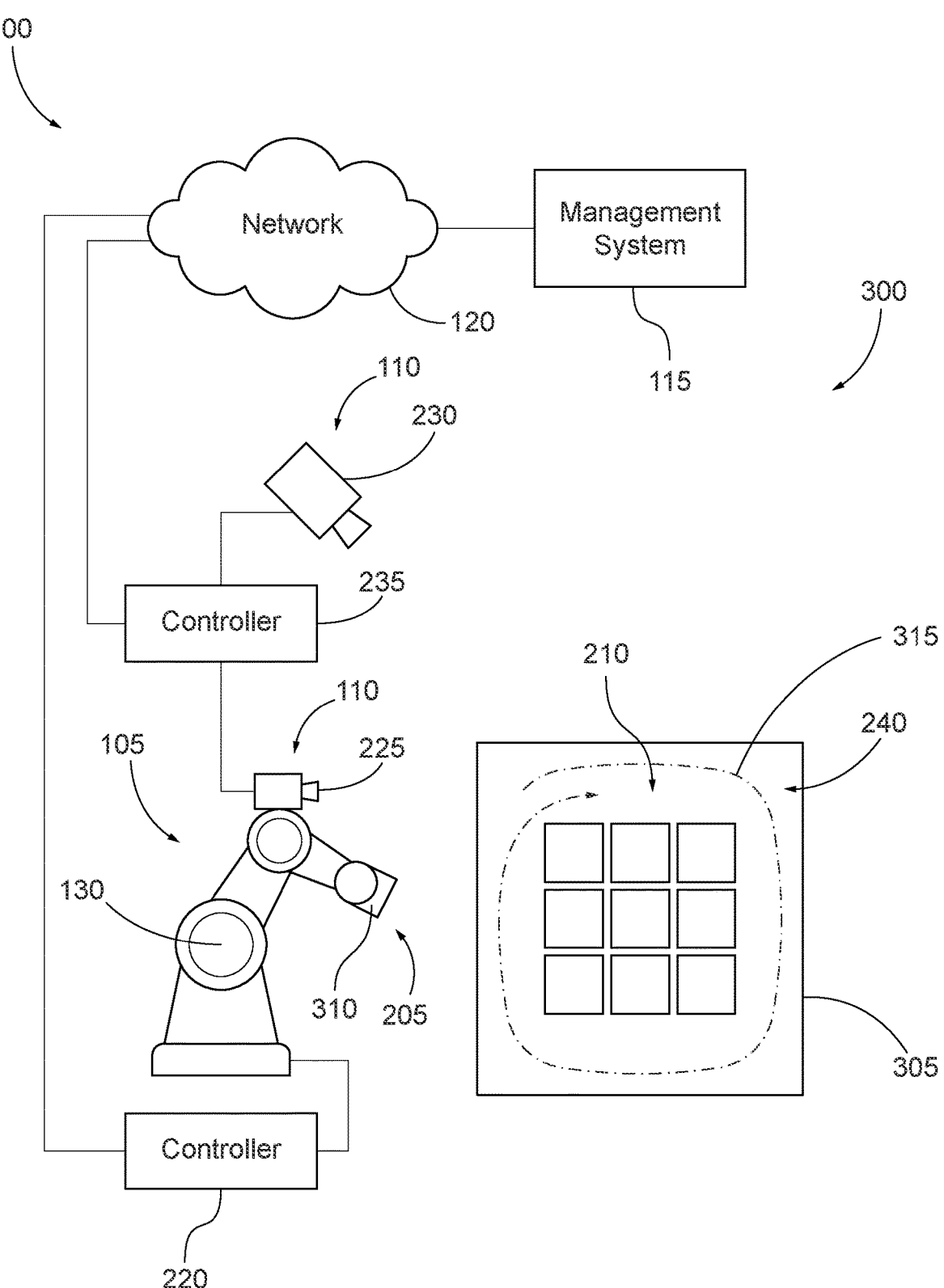
FIG. 3 is a diagram of the FIG. 1 motion planning system operating at a palletizer station.

Referring to FIG. 3, the robot arm 130 is configured to operate in a palletizer station 300 in one example. At the palletizer station 300, the robot arm 130 is configured to load and/or unload items 210 on a pallet 305. In one instance, the pallet 305 can be a block pallet, box, vehicle, tote, and/or another structure. The items 210 on the pallet 305 can include a variety of types of items. For example, the items 210 can include boxes, packages, cartons, and/or another type of item. Typically, but not always, the items 210 at the palletizer station 300 are stackable and/or have flat sides. Additionally, it should be recognized that the palletizer station 300 can include another type of robot, such as another one of the robots 105 depicted in FIG. 1, or another type of robot.

As illustrated, the robot arm 130 includes a palletizer tool 310 that is configured to perform palletizing tasks. In one example, the palletizer tool 310 is configured to couple to the items 210 using a vacuum. In another example, the palletizer tool 310 can include another device such as an electromagnet and/or a mechanical claw as shown in FIG. 2. The palletizer station 300 further includes the robot controller 220, environment camera 230, and camera controller 235 in addition to the robot arm 130 and palletizer tool 310.

At the palletizer station 300, the path 240 includes a palletizing path 315. The palletizing path 315 defines positions for the palletizer tool 310 and/or another part of the robot arm 130 to travel around the items 210 on the pallet 305. As illustrated, the items 210 are generally stacked in a pile on the pallet 305. In the illustrated embodiment, the palletizing path 315 begins at a position radially outwards from the center of the pile and continues around the perimeter of the items 210. In most cases, the palletizing path 315 will appear to be generally random to an outside observer such as by the robot arm 130 traveling in random zigzag patterns. In another embodiment, the palletizing path 315 begins on the face of the items 210 stacked on the pallet 305 nearest the robot arm 130. The motion plan of the robot arm 130 follows a path that removes the items 210 from top to bottom and from front to back until all of the items 210 are picked from the pallet 305. It should be appreciated that the palletizing path 315 can be different in other examples. For example, the robot arm 130 in one variation initially moves the camera 110 in a predefined circular or spiral path around the pallet 305 and/or the pallet 305 is rotated so that the camera 110 is able to image the initial state of the items 210 on all sides of the pallet 305. Once the initial state of the items 210 is determined, the management system 115 then determines the palletizing path 315 for subsequent palletizing and/or depalletizing solutions, and the palletizing path 315 is updated on a continuous or nearly continuous basis.

In another embodiment, the palletizing path 315 begins near an item 210 stacked on top of other items 210 and then continues around different items 210 stacked on a similar number of other items 210 and/or at a similar distance from the pallet 305. The palletizing path 315 then continues towards the items 210 resting directly on the pallet 305. In yet another embodiment, the initial shape of the palletizing path 315 is determined based on the shape, number of layers, and/or arrangement of the items 210 on the pallet 305.

In the FIG. 3 example, the robot arm 130 is configured to move the palletizer tool 310 along the palletizing path 315. The management system 115 is configured to analyze the position, orientation, shape, and/or other details of the items 210 to determine palletizing and/or depalletizing solutions for the robot arm 130 using the palletizer tool 310. As should be appreciated, the path 240 and picking techniques described for the picking station 200 in reference to FIG. 2 can be utilized by the robot 105 and management system 115 for the palletizer station 300 and/or another material handling scenario. For example, the management system 115 can rank depalletizing solutions based on the visibility of each item 210 on the pallet 305, based on the location of each item 210 relative to an ideal depalletizing point, based on the location of each item 210 relative to the top of the stack of items 210 on the pallet 305, and/or based on another consideration.

Figure 4:
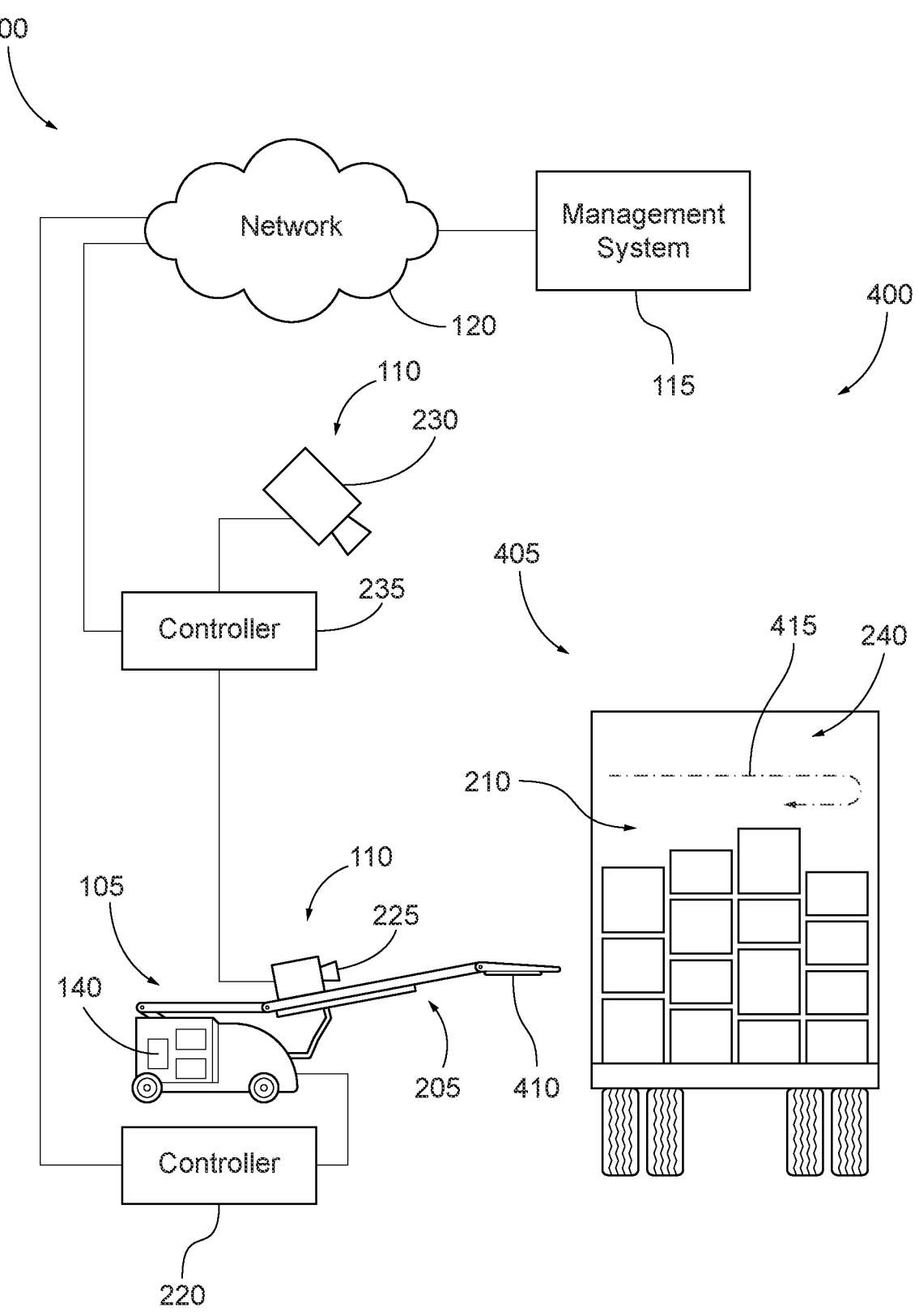
FIG. 4 is a diagram of the FIG. 1 motion planning system operating at a trailer loading station.

FIG. 4 depicts an example of a trailer loading station 400 where the robot 105 is configured to operate. In the illustrated example, the robot 105 is the robotic mast vehicle 140 as depicted in FIG. 1. At the trailer loading station 400, the robotic mast vehicle 140 is configured to load and/or unload items 210 on a trailer 405. In one instance, the trailer 405 can be a semi-truck trailer. In another example, the robotic mast vehicle 140 can load and/or unload items from a shelving structure, storage unit, vehicle, and/or another structure. The items 210 on the trailer 405 can include a variety of types of items. For example, the items 210 can include boxes, packages, crates, and/or another type of item. Typically, but not always, the items 210 at the trailer loading station 400 are stackable and/or have flat sides. Additionally, it should be recognized that the trailer loading station 400 can include another type of robot, such as another one of the robots 105 depicted in FIG. 1, or another type of robot.

As illustrated, the robotic mast vehicle 140 includes a trailer loading tool 410 that is configured to perform trailer loading tasks. In one example, the trailer loading tool 410 is configured to move the items 210 using a roller, conveyor, and/or another device. In another example, the trailer loading tool 410 can include an electromagnet, vacuum, mechanical claw, and/or other devices, such as the end effectors 205 shown in FIGS. 2 and 3. The trailer loading station 400 further includes the robot controller 220, environment camera 230, and camera controller 235 in addition to the robotic mast vehicle 140 and trailer loading tool 410.

At the trailer loading station 400, the path 240 includes a trailer loading path 415. The trailer loading path 415 defines positions for the trailer loading tool 410 and/or another part of the robotic mast vehicle 140 to travel around the items 210 on the trailer 405. As illustrated, the items 210 are generally stacked in a pile on the trailer 405. In the illustrated embodiment, the trailer loading path 415 begins near an item 210 stacked on top of other items 210 and then continues around different items 210 stacked on a similar number of other items 210 and/or at a similar height within the trailer 405. The trailer loading path 415 generally moves from one side of the trailer 405 to an opposite side of the trailer 405 and then continues towards the items 210 resting directly on the trailer 405. In other words, the trailer loading path 415 forms a winding or serpentine type path. In yet another embodiment, the initial shape of the palletizing path 315 is determined based on the shape, number of layers, and/or arrangement of the items 210 on the trailer 405.

In the FIG. 4 example, the robotic mast vehicle 140 is configured to move the trailer loading tool 410 along the trailer loading path 415. The management system 115 is configured to analyze the position, orientation, shape, and/or other details of the items 210 to determine trailer loading and/or unloading solutions for the robotic mast vehicle 140 using the trailer loading tool 410. As should be appreciated, the robot 105 and management system 115 in FIG. 4 can utilize the path 240 and picking techniques described for the picking station 200 and palletizer station 300, in reference to FIGS. 2 and 3, and/or another material handling scenario. For example, the management system 115 can rank unloading solutions based on the visibility of each item 210 in the trailer 405, based on the location of each item 210 relative to an ideal unloading point, based on the location of each item 210 relative to the top of the stack of items 210 in the trailer 405, and/or based on another consideration.

Figure 5:
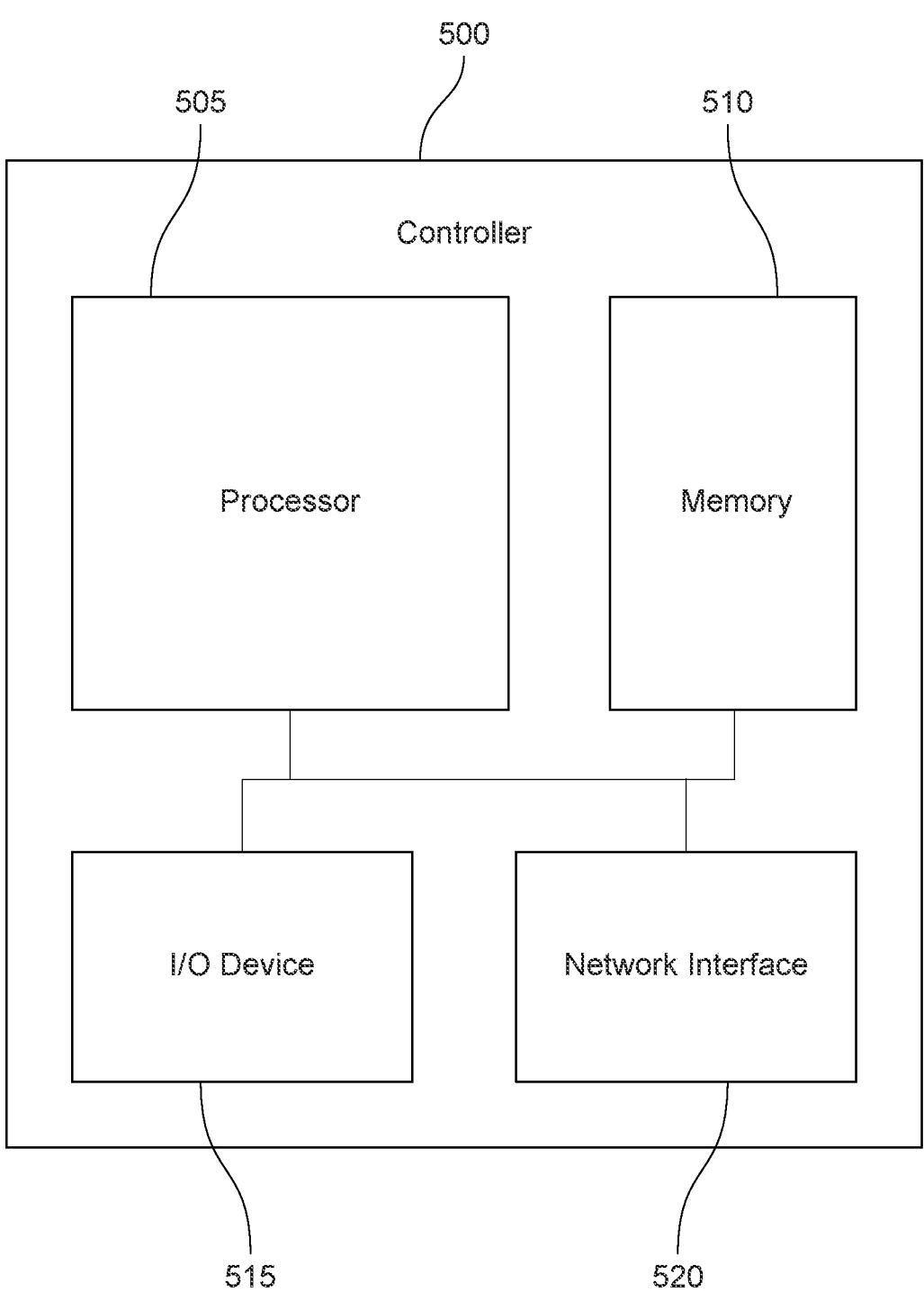
FIG. 5 is a block diagram of a controller that is used in the motion planning system of FIGS. 2, 3, and 4.

Referring to FIG. 5, one embodiment of a controller 500 can be used in one or more devices of the motion planning system 100. For example, the controller 500 can be incorporated into the robot controller 220 and/or camera controller 235 in FIGS. 2, 3, and 4. In one form, the robots 105 can include the controller 500, such as the robot arm 130, robotic shuttle 135, and/or robotic mast vehicle 140 in FIG. 1. The controller 500 generally includes at least one processor 505, memory 510, I/O device 515, and network interface 520. The processor 505 is operatively connected to and configured to communicate with the memory 510, I/O device 515, and network interface 520. It should be recognized that the controller 500 can be configured differently than is shown in FIG. 5 in one or more devices of the motion planning system 100.

The processor 505 is configured to process data and instructions, perform calculations, and perform other operations for the controller 500. For example, the processor 505 can process instructions for the robot 105 and/or camera 110, analyze image data, determine the path 240, and/or perform other tasks. In one embodiment, the processor 505 is configured to perform tasks involving an artificial intelligence (AI) model, such as performing a machine learning algorithm to train an AI model and/or performing an algorithm that involves a trained AI model. The memory 510 is configured to store data, algorithms, and/or other information. For example, the memory 510 may store data used for training, testing, and/or validating AI models. In another example, the memory 510 may store machine learning algorithms and/or AI models that have been developed through machine learning.

The I/O device 515 is configured to provide an interface between the controller 500 and various external devices. For example, the I/O device 515 may connect a controller 500 to one or more robots 105, cameras 110, and/or other devices. In one form, the I/O device 515 is configured to support communication between the controller 500 and such devices. For example, the controller 500 may directly send and/or receive data, commands, and/or other information using the I/O device 515. The I/O device 515 can also be used by a human operator to interact with the robot 105 and/o camera 110. Similarly, the network interface 520 is configured to provide an interface between the controller 500 and various networks. The network interface 520 facilitates wired and/or wireless communication with the network 120. In one form, the network interface 520 includes a network interface card (NIC). In other forms, the network interface 520 is not a separate component, but the network interface 520 is integrated into the processor board of the controller 500.

Figure 6:
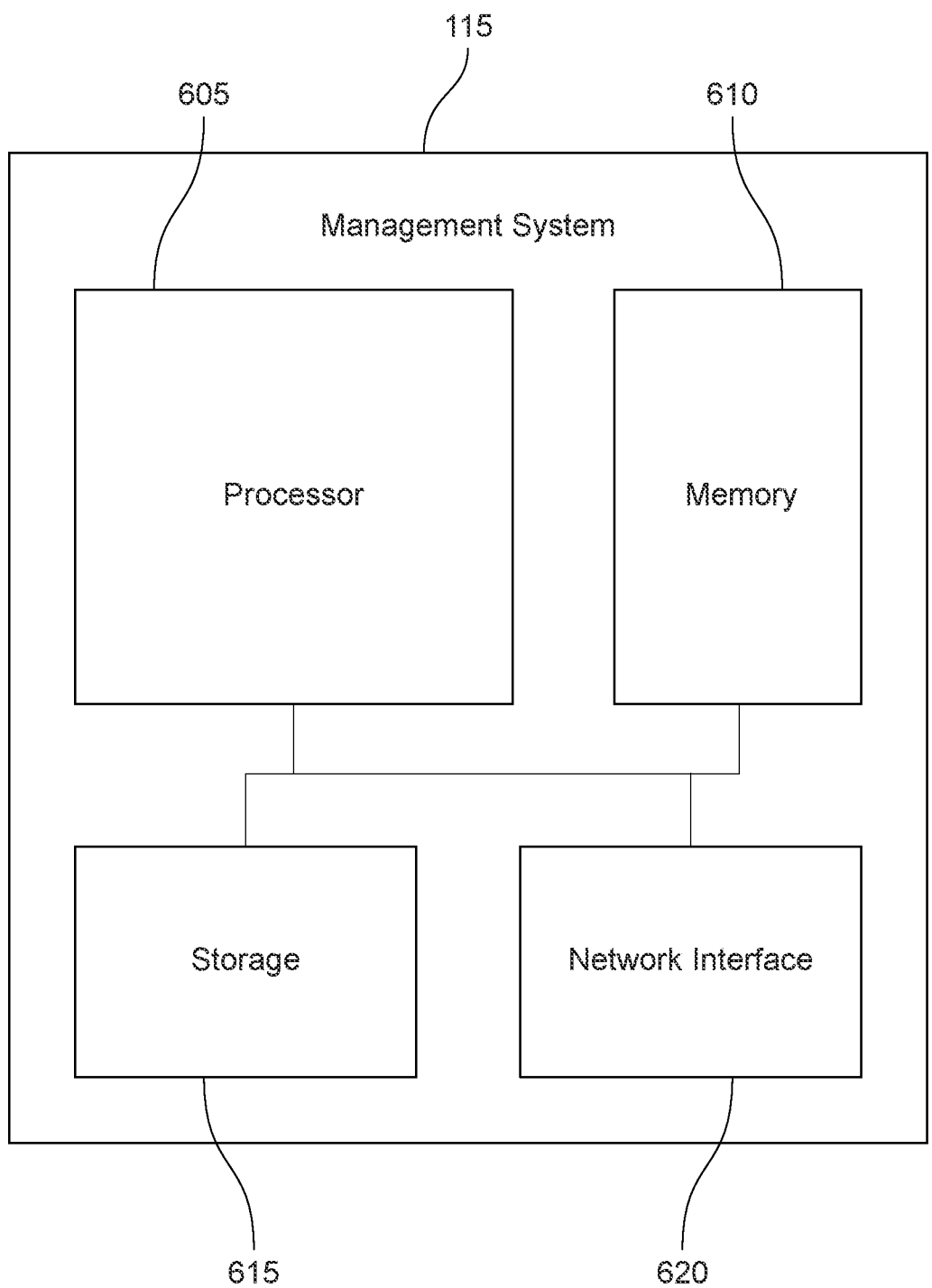
FIG. 6 is a block diagram of a management system used in the FIG. 1 motion planning system.

FIG. 6 shows a block diagram of one example of the management system 115. The management system 115 generally includes at least one processor 605, memory 610, long-term storage device 615, and network interface 620. The processor 605 is operatively connected to and configured to communicate with the memory 610, long-term storage device 615, and network interface 620. It should be recognized that the management system 115 could be configured differently than is shown in FIG. 5 in another example. The processor 605 is configured to process data and instructions, perform calculations, and perform other operations for the management system 115. For example, the processor 605 can determine instructions for the robot 105, analyze image data from the camera 110, determine the path 240, determine instructions for other equipment in the motion planning system 100, and/or perform other tasks. In one embodiment, the processor 605 is configured to perform tasks for the artificial intelligence system 145, such as performing a machine learning algorithm to train an AI model and/or performing an algorithm that involves a trained AI model.

The memory 610 is configured to store data, algorithms, and/or other information on a short-term basis. The long-term storage device 615 is configured to store larger quantities of such information on a long-term basis. For example, the memory 610 and/or long-term storage device 615 may store data used for training, testing, and/or validating AI models. In another example, the memory 610 and/or long-term storage device 615 may store machine learning algorithms and/or AI models that have been developed through machine learning. In one form, the long-term storage device 615 includes a hard drive, an array of hard drives, and/or a dispersed system of virtual hard drives. The network interface 620 is configured to provide an interface between the management system 115 and various networks. The network interface 620 facilitates wired and/or wireless communication with the network 120. In one form, the network interface 620 includes a network interface card (NIC). In other forms, the network interface 620 is not a separate component, but the network interface 620 is integrated into the processor board of the management system 115.

Through the processor 605, memory 610, long-term storage device 615, and network interface 620, the management system 115 is able to perform the methods described herein. In one embodiment, the management system 115 sends instructions for performing parts of the methods to other devices of the motion planning system 100 using the network 120. For example, the management system 115 can send instructions to the robot 105, end effector 205, and/or robot controller 220 to perform various actions. In another embodiment, the management system 115 utilizes the artificial intelligence system 145 to train the robot 105, robot controller 220, camera controller 235, and/or another device to perform various tasks. As examples, the artificial intelligence system 145 may train the robot 105 and/or robot controller 220 to pick items, train the robot controller 220 to move the robot 105 in a desired way, train the camera controller 235 to identify objects, and/or train devices to perform other tasks. The artificial intelligence system 145 is configured to utilize machine learning algorithms to train the management system 115 and other devices. In one example, the machine learning algorithms train the devices based on data collected by the cameras 110 or other sensors in the motion planning system 100.

Figure 7:
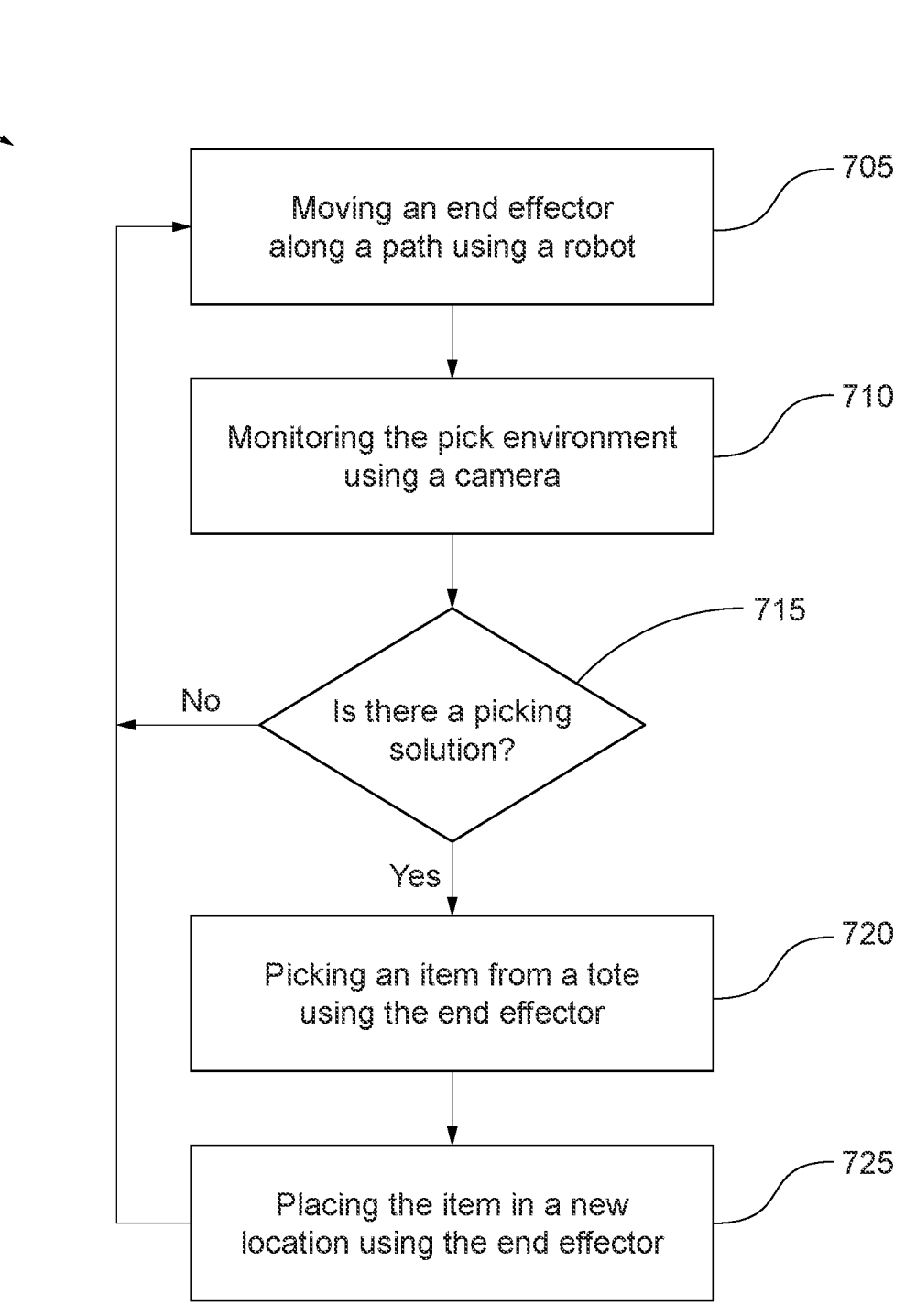
FIG. 7 is a flowchart of a method for controlling the motion of one or more robots in the FIG. 1 motion planning system.

A flowchart 700 in FIG. 7 illustrates a technique for determining the movement of the robot 105. The technique of FIG. 7 is generally described as being performed by the management system 115 of the motion planning system 100. In other variations, all or part of the actions illustrated in the FIG. 7 flowchart 700 can be performed by the robot controller 220, camera controller 235, and/or other devices. It should be recognized that various actions are performed by the appropriate parts of the management system 115, such as the processor 605, memory 610, long-term storage device 615, and network interface 620. For example, the processor 605 may perform actions that require making decisions and analyzing information, and the network interface 620 may perform actions that require sending instructions to other parts of the motion planning system 100. For clarity, the actions are described as being performed by the management system 115. Further, the technique will be described as being performed in the picking station 200 of FIG. 2 and using the robot arm 130. Nevertheless, it should be appreciated that the technique can be performed in other material handling environments, such as the palletizer station 300 of FIG. 3 and/or the trailer loading station 400 of FIG. 4, and can utilize other types of robots 105, such as the robotic shuttle 135 and/or robotic mast vehicle 140.

At stage 705, the management system 115 instructs the robot 105 to move the end effector 205 along the path 240. In one example, the robot arm 130 moves the picking tool 250 along the picking path 255. The management system 115 may determine the path 240 based on images captured by the camera 110 and/or through utilizing the artificial intelligence system 145. As should be appreciated, another part of the robot 105 or the entire robot 105 may move along the path 240. At stage 710, the management system 115 monitors the material handling environment 125 using the camera 110. In one instance, the management system 115 performs the actions of stage 710 as the robot 105 moves along the path 240. The management system 115 analyzes images sent over the network 120 by the camera 110. For example, the management system 115 may determine the shape, position, orientation, and/or other characteristics of the end effector 205 and/or the items 210. The management system 115 may also perform other computer vision tasks. In one instance, the management system 115 utilizes the artificial intelligence system 145 to perform such computer vision tasks. For example, the artificial intelligence system 145 may include a neural network that performs the computer vision tasks using image data from the camera 110. At stage 715, the management system 115 checks for a picking solution. The management system 115 determines whether there is a picking solution based on the visibility of the items 210, the position of the items 210, the position of the end effector 205, and/or other factors. In one embodiment, the management system 115 only considers picking solutions for items 210 that are directly on the path 240 and within close proximity of the end effector 205. For example, the management system 115 considers picking solutions that are in view of the robot camera 225 that is positioned near the end effector 205. In another example, the management system 115 utilizes the artificial intelligence system 145 to generate sample picking solutions and determine whether the robot 105 can perform the picking solutions. If the management system 115 determines there is not an acceptable picking solution at the current position, the management system 115 continues back to stage 705 to repeat the actions of the previous stages. Conversely, if the management system 115 determines an acceptable picking solution, the management system 115 continues to stage 720.

At stage 720, the management system 115 instructs the robot 105 to pick the item 210 from the tote 215 using the end effector 205. The management system 115 sends picking instructions based on the determined picking solution, including a specific series of movements for the robot 105, a location for the robot 105 to move to, a specific orientation for the end effector 205, and/or other movement information. The management system 115 then proceeds to stage 725. At stage 725, the management system 115 instructs the robot 105 to place the item 210 at a location outside the tote 215. The management system 115 may instruct the robot 105 to place the item 210 in another tote 215, pallet 305, trailer 405, box, and/or other structure. By placing the item 210, the robot 105 is free to pick additional items 210. In one embodiment, the management system 115 utilizes the artificial intelligence system 145 to plan the picking and/or placing movement for the robot 105, such as through a neural network and/or other AI models. The management system 115 then proceeds back to stage 705 to repeat the previous stages and continuously provide picking instructions. In other variations, the management system 115 instructs the robot 105 to perform other material handling actions, such as loading and/or unloading the pallet 305 and/or trailer 405 using the picking tool 250, palletizer tool 310, and/or trailer loading tool 410.

Figure 8:
FIG. 8 is a flowchart of another method for controlling the motion of the FIG. 1 robots.
Figure 8:
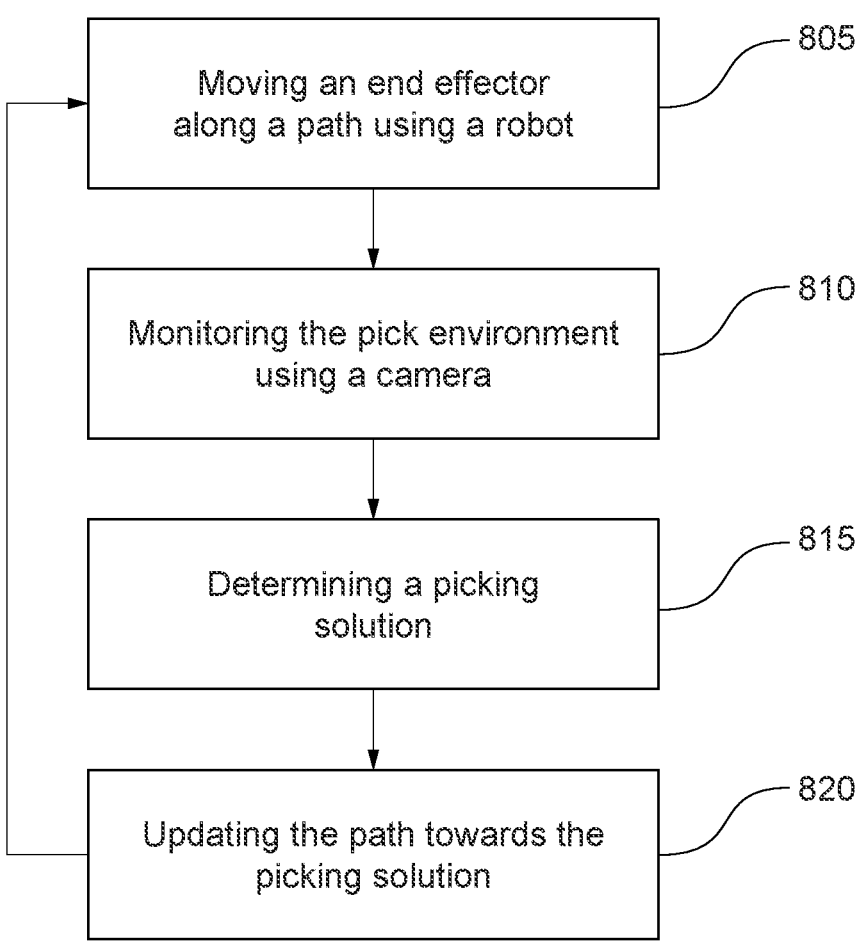

A flowchart 800 in FIG. 8 illustrates another technique for determining the movement of the robot 105. The technique of FIG. 8 is generally described as being performed by the management system 115 of the motion planning system 100. In other variations, all or part of the actions shown in the FIG. 8 flowchart 800 can be performed by the robot controller 220, camera controller 235, and/or other devices. It should be recognized that various actions are performed by the appropriate parts of the management system 115, such as the processor 605, memory 610, long-term storage device 615, and network interface 620. For example, the processor 605 may perform actions that require making decisions and analyzing information, and the network interface 620 may perform actions that require sending instructions to other parts of the motion planning system 100. For clarity, the actions are described as being performed by the management system 115. Further, the technique will be described as being performed in the picking station 200 of FIG. 2 and using the robot arm 130. Nevertheless, it should be appreciated that the technique can be performed in other material handling environments, such as the palletizer station 300 of FIG. 3 and/or the trailer loading station 400 of FIG. 4, and can utilize other types of robots 105, such as the robotic shuttle 135 and/or robotic mast vehicle 140.

At stage 805, the management system 115 instructs the robot 105 to move the end effector 205 along the path 240. In one example, the robot arm 130 moves the picking tool 250 along the picking path 255. The management system

115 may determine the path 240 based on images captured by the camera 110 and/or through utilizing the artificial intelligence system 145.

As should be appreciated, another part of the robot 105 or the entire robot 105 may move along the path 240. At stage 810, the management system 115 monitors the material handling environment 125 using the camera 110. In one instance, the management system 115 performs the actions of stage 810 as the robot 105 moves along the path 240. The management system 115 analyzes images sent over the network 120 by the camera 110. For example, the management system 115 may determine the shape, position, orientation, and/or other characteristics of the end effector 205 and/or the items 210. The management system 115 may also perform other computer vision tasks. In one instance, the management system 115 utilizes the artificial intelligence system 145 to perform such computer vision tasks. For example, the artificial intelligence system 145 may include a neural network that performs the computer vision tasks using image data from the camera 110. In one embodiment, the actions of stage 805 and stage 810 are performed in the same or a similar way as the actions of stage 705 and stage 710 in FIG. 7.

At stage 815, the management system 115 determines a picking solution. In one example, the management system 115 considers the visibility of the items 210, the position of the items 210, the position of the end effector 205, and/or other factors. In one embodiment, the management system 115 chooses from multiple picking solutions for items 210 that are positioned in various portions of the tote 215. For example, the management system 115 may consider picking solutions based on a view from the environment camera 230 that captures images of the entire tote 215. In another example, the management system 115 utilizes the artificial intelligence system 145 to generate multiple picking options and select one of the picking options. The management system 115 then proceeds to stage 820. At stage 820, the management system 115 updates the path 240 towards the location of the picking solution. For example, the management system 115 may update the path 240 such that a portion of the path 240 is positioned on or above the location of the picking solution. The management system 115 considers the locations of the end effector 205 and picking solution, the configuration of the joints on the robot arm 130, the arrangement of the items 210, and/or other factors to determine an updated path 240. In one example, the management system 115 may utilize the artificial intelligence system 145 to generate one or more options to update the path 240 using a neural network and select one path 240 updated using another neural network. After updating the path 240, the management system 115 continues to stage 805 such that the management system 115 instructs the robot 105 to travel along the updated path 240. In other variations, the management system 115 determines options for the robot 105 to perform other material handling actions, such as loading and/or unloading the pallet 305 and/or trailer 405 using the picking tool 250, palletizer tool 310, and/or trailer loading tool 410. Further, the management system 115 may determine and update various paths 240 for such purposes, such as the palletizing path 315 and/or trailer loading path 415.

Figure 9:
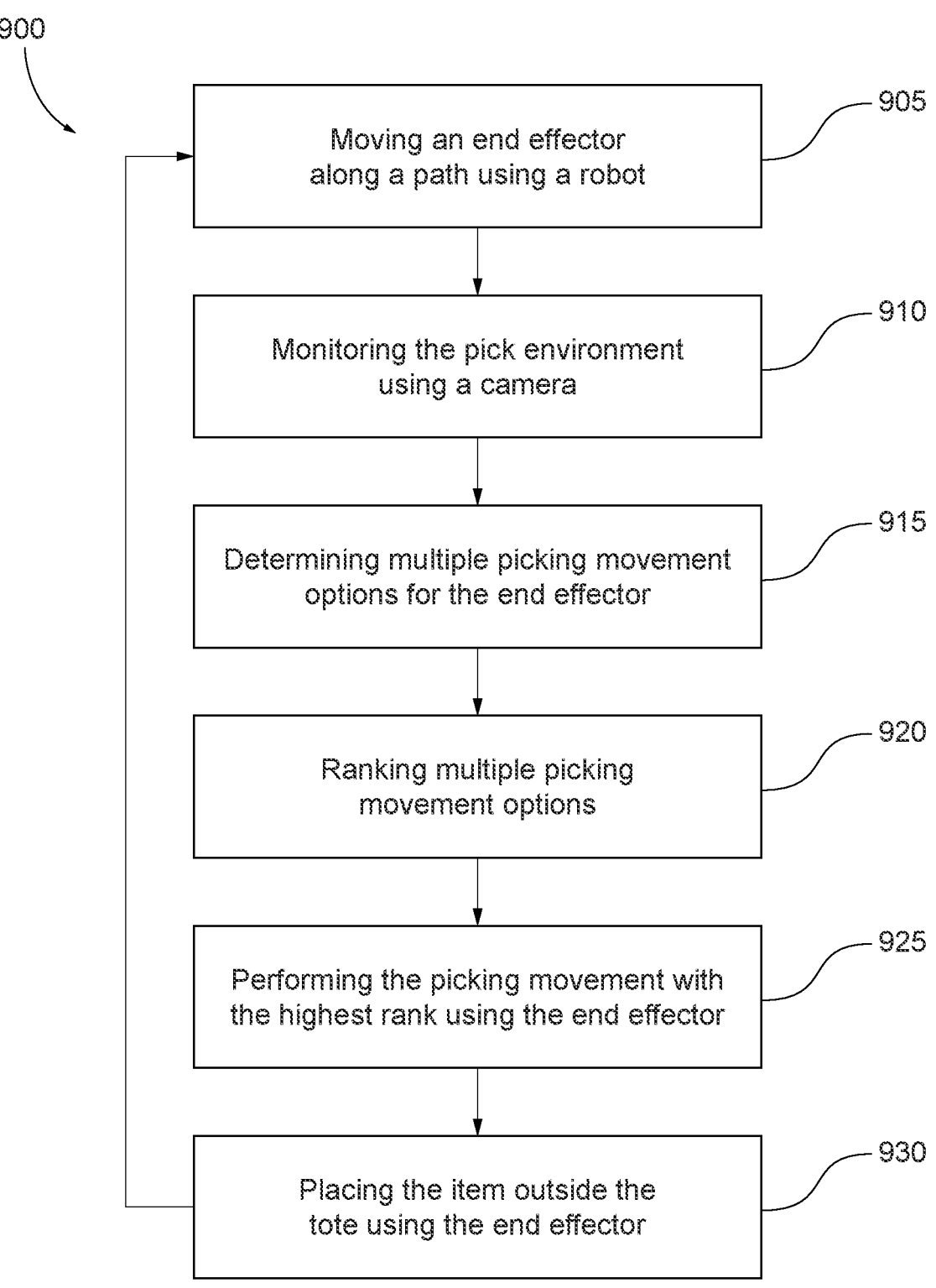
FIG. 9 is a flowchart of a further method for controlling the motion of the FIG. 1 robots.

A flowchart 900 in FIG. 9 illustrates yet another technique for determining the movement of the robot 105. The technique of FIG. 9 is generally described as being performed by the management system 115 of the motion planning system 100. In other variations, all or part of the actions illustrated in the FIG. 9 flowchart 900 can be performed by the robot controller 220, camera controller 235, and/or other devices.

It should be recognized that various actions are performed by the appropriate parts of the management system 115, such as the processor 605, memory 610, long-term storage device 615, and network interface 620. For example, the processor 605 may perform actions that require making decisions and analyzing information, and the network interface 620 may perform actions that require sending instructions to other parts of the motion planning system 100. For clarity, the actions are described as being performed by the management system 115. Further, the technique is described as being performed in the picking station 200 of FIG. 2 and using the robot arm 130; although, it should be appreciated that the technique can be performed in other material handling environments, such as the palletizer station 300 of FIG. 3 and/or the trailer loading station 400 of FIG. 4, and can utilize other types of robots 105, such as the robotic shuttle 135 and/or robotic mast vehicle 140.

At stage 905, the management system 115 instructs the robot 105 to move the end effector 205 along the path 240. In one example, the robot arm 130 moves the picking tool 250 along the picking path 255. The management system 115 may determine the path 240 based on images captured by the camera 110 and/or through utilizing the artificial intelligence system 145. As should be appreciated, another part of the robot 105 or the entire robot 105 may move along the path 240. At stage 910, the management system 115 monitors the material handling environment 125 using the camera 110. In one instance, the management system 115 performs the actions of stage 910 as the robot 105 moves along the path 240. The management system 115 analyzes images sent over the network 120 by the camera 110. For example, the management system 115 may determine the shape, position, orientation, and/or other characteristics of the end effector 205 and/or the items 210. The management system 115 may also perform other computer vision tasks. In one instance, the management system 115 utilizes the artificial intelligence system 145 to perform such computer vision tasks. For example, the artificial intelligence system 145 may include a neural network that performs the computer vision tasks using image data from the camera 110. In one embodiment, the actions of stage 905 and stage 910 are performed in the same or a similar way as the actions of stage 805 and stage 810 in FIG. 8.

At stage 915, the management system 115 determines multiple picking movement options. For example, the management system 115 may utilize the artificial intelligence system 145 to generate multiple picking movement. Picking movements include repositioning the end effector 205 using the robot 105, reorienting the end effector 205 towards a picking point, picking an item 210 using the end effector 205, and/or other movements. In other variations, the management system 115 determines options for the robot 105 to perform other material handling actions, such as loading and/or unloading the pallet 305 and/or trailer 405 using the picking tool 250, palletizer tool 310, and/or trailer loading tool 410.

At stage 920, the management system 115 ranks the multiple picking movement options. In one instance, the ranking includes the visibility of each item 210 in the tote 215. The visibility is affected by obstructions to the view from the camera 110, imperfections in the images captured by the camera 110, and/or other such factors that affect the ability of the management system 115 to identify the items 210. For example, the artificial intelligence system 145 may not be able to accurately perform computer vision tasks due to such factors. In one example, the robot 105, tote 215, and/or other equipment can be positioned between an item 210 and the camera 110 such as to obstruct the view from the robot camera 225 and/or environment camera 230. In another example, the lighting conditions in the material handling environment 125 and/or light reflected off the items 210 can cause glare, blur, and/or other imperfections in the captured images. In one specific example, the ranking includes the extent that the visibility of each item 210 is obstructed by the other items 210 in the tote 215. In another instance, the ranking includes the location of each item 210 in relation to an ideal picking point. The ideal picking point is a hypothetical picking solution determined by the management system 115, a picking solution selected from an initial ranking, and/or another location. In one example, the artificial intelligence system 145 is trained to determine an ideal picking point. In yet another instance, the ranking includes the position of each item 210 relative to a top of the pile of items 210. For instance, the management system 115 may identify the three-dimensional positions of the items 210 and determine which item 210 is positioned furthest in an upward direction. Alternatively, the management system 115 may identify the top of the pile based on an item 210 that is not covered by other items 210. The management system 115 may utilize the artificial intelligence system 145 to determine the top of the pile.

At stage 925, the management system 115 instructs the robot 105 to perform the highest ranked picking movement option using the end effector 205. For example, the management system 115 may select a picking movement targeted towards the item 210 with the best visibility, the item 210 located at the top of the pile of items 210, the item 210 closest to an ideal picking point, and/or another item 210. Again, the picking movement includes repositioning the end effector 205 using the robot 105, reorienting the end effector 205 towards a picking point, picking an item 210 using the end effector 205, and/or other movements. In one embodiment, the management system 115 determines the item 210 and/or location for picking, and the robot controller 220 and/or another device determines the specific movements for the robot 105 and end effector 205 to perform the desired pick. Further, the artificial intelligence system 145 can determine the movements of various joints on the robot 105 and end effector 205 to perform such movements. The management system 115 optionally continues to stage 930. Specifically, the management system 115 performs the actions of stage 930 if the picking movement at stage 925 includes picking the item 210. At stage 930, the management system 115 instructs the robot 105 to place the item 210 at a new location, such as in another tote 215, pallet 305, trailer 405, box, or another structure. By placing the item 210, the robot 105 is free to continue moving and performing additional picking operations. The management system 115 continues back to stage 905 to repeat the actions of the flowchart 900.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Algorithm" generally refers to a sequence of instructions to solve a problem or to perform a task, such as a calculation.

Typically, algorithms are implemented on computers. An algorithm on a computer may be used to automate a desired process or task on that computer or across multiple computers and/or other devices. As examples, a computer may utilize an algorithm to make a prediction based on data, control a robotic device to move along a desired path, and/or calculate the solution to an equation. A human may determine the instructions of an algorithm and program the algorithm onto a computer or other device. In some cases, a computer or other machine may determine at least part of an algorithm. For example, an artificial intelligence system may determine an algorithm for performing a desired task. Additionally, algorithms, such as machine learning algorithms, may be utilized to teach an artificial intelligence system to create new algorithms or improve existing algorithms for performing desired tasks.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Artificial intelligence" or "AI" generally refers to the ability of machines to perceive, synthesize, and/or infer information. AI may enable a machine to perform tasks which normally require human intelligence. For example, AI may be configured for speech recognition, visual perception, decision making, language interpretation, logical reasoning, and/or moving objects. Typically, AI is embodied as a model of one or more systems that are relevant to tasks that a machine is configured to perform. AI models may be implemented on a device, such as a mechanical machine, an electrical circuit, and/or a computer. AI models may be implemented in an analog or digital form and may be implemented on hardware or software. The implementation of AI may also utilize multiple devices which may be connected in a network.

"Autonomous Mobile Unit" or "AMU" generally refer to a mobile robot that is able to automatically self-navigate between various locations. For example, AMUs are typically, but not always, able to automatically navigate by following markers, such as wires or magnets embedded in the floor, by using lasers, and/or by using one or more vision systems. AMUs are also typically, but not always, designed to automatically avoid collisions, such as with other AMUs, equipment, and personnel. AMUs are commonly, but not always, used in industrial applications to move materials around a manufacturing facility or warehouse.

"Bin" or "Tote" generally refers to a container or structure that can store or support physical objects. In one embodiment, a bin refers to a container, surface, or structure that is used in a picking system. For example, a bin may be a basket, box, crate, pallet, vehicle, conveyor, shelving structure, storage device, table, and/or a stationary surface. A bin may define an opening or have one or more unclosed sides to allow items to be added to or removed from the bin "Camera" generally refers to a device that records visual images. Typically, a camera may record two- and/or three-dimensional images. In some examples, images are recorded in the form of film, photographs, image signals, and/or video signals. A camera may include one or more lenses or other devices that focus light onto a light-sensitive surface, for example a digital light sensor or photographic film. The light-sensitive surface may react to and be capable of capturing visible light or other types of light, such as infrared (IR) and/or ultraviolet (UV) light.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Computer Vision" generally refers to the ability of a computer to obtain information from images and/or videos. Computer vision may perform similar tasks as in a human visual system, for example recognizing objects, tracking motion of objects, determining three-dimensional poses, determining three-dimensional shapes, and/or detecting visual events. A computer or other device may use computer vision to analyze image and/or video data recorded by a camera and/or vision system. In some embodiments, computer vision utilizes artificial intelligence to perform tasks. For example, computer vision may involve one or more artificial neural networks that are trained to obtain certain information from given images and/or videos.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Convolutional Neural Network" or "CNN" generally refers to an artificial neural network wherein one or more neurons in at least one layer of the artificial neural network perform a mathematical convolution on an input to that layer. As examples, CNNs are used for identifying objects in an image, tracking an object in a video, classifying images, identifying words in speech, understanding meaning from text, generating text, generating images, and/or performing other tasks. In some cases, a CNN more accurately generates, analyzes, and/or performs other tasks related to images and video than other types of neural networks. In one example, the neurons of each layer in a CNN are fully connected such that each neuron of one layer is connected to every neuron of neighboring layers. In some cases, the CNN includes features to mitigate negative effects of a fully connected neural network, such as overfitting data.

"End of Arm Tool" (EoAT) or "End Effector" generally refers to a device at the end of the robotic arm that is designed to interact with the environment. The nature of this interaction of the device with the environment depends on the application of the robotic arm. The EoAT can for instance interact with an SKU or other environmental objects in a number of ways. For example, the EoAT can include one or more grippers, such as impactive, ingressive, astrictive, and/or contiguitive type grippers. Grippers typically, but not always, use some type of mechanical force to grip objects. However, other types of interactions, such as those based on suction or magnetic force, can be used to secure the object to the EoAT. By way of non-limiting examples, the EoAT can alternatively or additionally include vacuum cups, electromagnets, Bernoulli grippers, electrostatic grippers, van der Waals grippers, capillary grippers, cryogenic grippers, ultrasonic grippers, and laser grippers, to name just a few.

"Generative Network" or "Generator" generally refers to a neural network that generates candidates as outputs. As examples, the output candidates are images, videos, speech, text, and/or instructions for a machine. The generator is configured to produce outputs that are similar to or indistinguishable from information obtained from a training dataset. In some cases, the outputs of a generator are evaluated by another neural network, for example a discriminator network. In one embodiment, the generator is given random data as input. The generator may perform operations on the input data. In some cases, the generator also receives information from a discriminator network that is used to train the generator and modify the operations of the generator.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Item" generally refers to an individual article, object, or thing. Commonly, but not always, items are handled in warehouse and material handling environments. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

Loading dock-generally refers to an area of a building or other structure where cargo items for cargo carriers (usually, but not always, road, rail, or sea) are loaded and unloaded. Cargo items can be also staged at the loading dock. Loading docks are commonly found on commercial and industrial buildings, and warehouses in particular. Loading docks may be exterior, flush with the building envelope, or fully enclosed. Loading docks are not just limited to fully enclosed buildings, but instead, can be located at locations that are partially or fully open to the outside environment.

"Machine Learning" or "Machine Learning Algorithm" generally refers to a way of developing methods for performing tasks within artificial intelligence (AI) systems. Machine learning algorithms build models based on given sets of sample data. Using these models, a machine learning algorithm may make predictions or decisions about performing tasks and may improve the ability of an AI system to perform those tasks. Examples of machine learning include supervised learning, unsupervised learning, reinforcement learning, deep learning, and statistical learning. Machine learning algorithms can be implemented on a device, for example a computer or network of computers. Implementations of machine learning may also incorporate various types of models, including artificial neural networks, decision trees, regression analysis, Bayesian networks, gaussian processes, and/or genetic algorithms.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Model" generally refers to a representation of a system, process, and/or object. Models modify one or more inputs using equations and/or logical operations to produce one or more outputs. A variety of systems, processes, and objects can be represented by models, including networks of neurons in a brain. Some models do not exactly portray the system or process and are a generalized or estimated representation to a certain extent. Some models produce varying outputs in response to the same input. For example, a statistical model of a system may involve probabilistic distributions based on randomly generated numbers such that the output is random to a certain degree.

"Network" or "Computer Network" generally refers to a telecommunications system that allows computers or other electronic devices to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Neural Network" or "Artificial Neural Network" generally refers to a model composed of multiple nodes. Each node receives a signal from one or more inputs or other nodes. Each node may also perform an operation on the received signal. Each node then sends a signal to one or more other nodes or outputs. The nodes may be arranged in layers such that one or more signals travels across the layers sequentially. The neural network may be given data that trains the neural network. The neural network may be trained to perform a variety of tasks, for example to recognize objects in an image, recognize patterns in a sequence, replicate motion, and/or approximate a function.

"Neuron" or "Node" or "Artificial Neuron" generally refers to a computational model within a neural network that receives one or more inputs and produces an output. Typically, the model of a neuron applies weights to the one or more inputs and sums the weighted inputs. The model of a neuron may include one or more non-linear functions, for example sigmoid, piecewise, and/or step functions. Inputs to a neuron may be outputs from one or more other neurons in the neural network or may be inputs to the neural network as a whole. Similarly, outputs of a neuron may be inputs to one or more other neurons in the neural network or may be outputs of the neural network as a whole.

"On-the-fly" generally refers to changing a system and/or process while the system and/or process is active. For example, an on-the-fly computer program may update or change in some way while the computer program and/or another related process is running. Other examples of on-the-fly systems and/or processes include updating robotic controls while a robot is operating, changing computer hardware while the computer performs a process, changing equipment in a system while the system operates, and/or other such changes. In some cases, an on-the-fly process does not utilize predetermined or preprogrammed instructions.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top, load deck upon which items are stacked, a bottom, support deck that rests on the ground, and a spacer structure positioned between the load and support decks to receive the forks of the forklift or pallet jack. However, the pallets can be configured differently. For example, the term pallet is used in a broader sense to include skids that have no support deck.

One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Palletizer" generally refers to a machine that automatically stacks and/or unstacks objects, such as cases of goods or other items, onto one or more pallets. Palletizers can include row-forming, in-line, and robotic type palletizers. In a row-forming type palletizer, cases or other objects are arranged in rows on a row forming area and then the rows of cases are moved onto a different area where a layer of cases is created. Once the layer is formed, the layer of cases are placed on the pallet. In-line type palletizers utilize a continuous motion flow divider that guides the cases or other objects into a target area on a layer forming platform. Robotic type palletizers have an end of arm tool (EoAT) or end effector that grabs the case or other object from a conveyor or layer table and then positions the case onto the pallet. The end of arm tool can accommodate a variation of pack patterns, package types, and package materials so as to allow the creation of mixed pallets that contain different products or other items.

"Pickable" generally refers to the quality of ease and/or efficiency with which an item can be retrieved from a storage location. The characteristics of whether the item is pickable can come in a binary form (i.e., yes/no) or can be along a spectrum (e.g., along a scale). The degree to which an item is considered pickable depends on a number of factors including, but not limited to, the characteristics of the item, the environment surrounding the item, and the equipment used to retrieve the item. For example, the size, weight, shape, and/or other physical characteristics of the item can impact the degree to which the item is pickable. The way the item is stored can also impact the degree to which the item is pickable. For instance, the orientation, visibility, and/or ability to identify the item when stored can impact the degree to which the item is pickable. Likewise, the capabilities of a human or robotic equipment can be a factor one whether the item is pickable.

"Picking" generally refers to the act of retrieving at least one item from a storage location and/container. The act of picking can be manually performed by a human or automatically performed by a piece of equipment. For example, automated picking uses machines, such as robots, to remove items from a storage location, a shipping location, and/or other locations. A robot for instance can be used to remove items from a tote, pallet, or storage rack.

"Placing" generally refers to the act of positioning at least one item in a specific location. The act of placing can be manually performed by a human or automatically performed by a piece of equipment. For example, automated placing uses machines, such as robots, to position items at a storage location, a shipping location, and/or other locations. A robot for instance can be used to place items into a tote, on a pallet, and/or into a shipping container.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Recurrent Neural Network" or "RNN" generally refers to an artificial neural network wherein the outputs of one or more nodes affects one or more inputs to the same nodes. Some RNN's include memory to store various internal states and/or inputs. The memory of an RNN is stored within the RNN, stored in another neural network, and/or stored by another means. Typically, RNN's are used to perform tasks with inputs that have varying lengths. As examples, RNN's are used for identifying handwritten words, recognizing speech, generating speech, identifying actions in a video, predicting motion of an object, and/or performing other tasks. A neural network is considered fully recurrent if the outputs of all neurons in the network connect to the inputs of all neurons.

"Robot" generally refers to a machine, such as one programmable by a computer, capable of carrying out a complex series of actions automatically. Sometimes, but not always, the robot automatically performs complicated, often repetitive tasks. Occasionally, the robot resembles all or part of a living creature that is capable of moving independently and/or performing complex actions such as grasping and moving objects. A robot can be guided by an external control device, or the control may be embedded within the robot.

"Robotic Arm" or "Robot Arm" generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "End of Arm Tool" (EoAT) for holding, manipulating, or otherwise interacting with the cargo items or other objects. The EoAT can be configured in many forms besides what is shown and described herein.

"Server" generally refers to a computer or group of computers that provide(s) data to other computers. It may serve data to systems on a local area network (LAN) and/or a wide area network (WAN) over the Internet.

"Shuttle" generally refers to a mechanism or device that is able to transport one or more items that are resting on and/or in the device. Each shuttle is capable of moving independently of one another and is able to move in multiple directions (e.g., horizontally, vertically, diagonally, etc.) along a shuttle frame. In one example, the shuttle includes a power train that is configured to move the shuttle, a steering system to direct shuttle movement, a tote transfer mechanism with a lift mechanism, and a robotic arm configured to transfer items to and/or from the shuttle. The power train in one example includes wheels that are driven by an electric motor, but in other examples, the power train can be configured differently. For instance, the power train can include a hydraulic motor and/or a pneumatic motor.

"Stacking Pattern" generally refers to a specific arrangement of objects, such as cases, products, or other items, on a pallet. For example, the stacking pattern determines how the items are placed on the pallet, the orientation of the items, and the number of layers of the items in which the items are stacked. Sometimes, but not always, a stacking pattern can be designed to optimize the use of space on the pallet and ensure that the items are stable and secure during transportation. For instance, different stacking patterns may be used depending on the size, shape, weight, and/or fragility of the products being palletized, as well as the type of pallet and transportation method used. Common stacking patterns in robotic palletization include column stacking, interlocking stacking, block stacking, and spiral stacking.

"Testing" generally refers to the process of assessing the performance of a model. In the context of machine learning, testing is performed on an artificial intelligence (AI) model. The models are assessed by evaluating their outputs when given a set of testing data as input. Typically, testing may occur after the process of validation and may be done on one model that is selected during validation. In some cases, testing is the final step in the development of an AI model.

"Testing Data" generally refers to data that is used in the process of testing models. Typically, testing data is used for testing artificial intelligence (AI) models. Testing data may be a subset of a larger data set that is used for other parts of developing AI models. For example, one initial data set may be divided into testing data and training data for developing an AI model. Testing data may include information that is used as input to a model and may include information about the expected output of a model. Information about the expected output may be used to evaluate the performance of a model during the testing process.

"Trailer" generally refers to an unpowered vehicle towed by another vehicle. For instance, a trailer can include a nonautomotive vehicle designed to be hauled by road, such as a vehicle configured to transport cargo, to serve as a temporary (or permanent) dwelling, and/or acting as a temporary place of business. Some non-limiting examples of trailers include open carts, semi-trailers, boat trailers, and mobile homes, to name a just few. Typically, trailers lack a power train for propelling themselves over long distances and require another powered vehicle to move them. However, trailers may include a power source, such as a battery or generator, for powering auxiliary equipment.

"Training" generally refers to the process of building a model based on given data. In the context of machine learning, training is used to teach artificial intelligence (AI) models information from a dataset and to make predictions. During training, models are given training data as input and output predictions for a target based on the given data. The models may be adjusted based on the outputs to improve the quality of predictions for the target. For example, a machine learning algorithm may adjust parameters of a model based on differences between the model output and information from the training data. The target of the model predictions may be included in information from the training data. Training may involve multiple iterations of models making predictions based on the data. In some cases, the training process is repeated or continued after a validation process.

"Training Data" generally refers to data that is used in the process of training models. Typically, training data is used for training artificial intelligence (AI) models. Training data may be a subset of a larger data set that is used for other parts of developing AI models. For example, one initial data set may be divided into testing data and training data for developing an AI model. Training data may include information that is used as input for a model and may include information about the expected output of a model. Training data may also include labels on data to better identify certain expected outputs. Models may be evaluated and adjusted based on labels or other information from the training data during the training process.

"Vacuum Cup" generally refers to a device or object made of elastic, flexible material having a surface that uses negative air pressure (i.e., a partial vacuum or suction) to adhere to a non-porous object.

"Validation" generally refers to the process of evaluating the performance of a model after training. In the context of machine learning, validation is performed on an artificial intelligence (AI) model. The models are given a set of validation data and the outputs of models are evaluated. Validation may be used to select the most accurate models from multiple trained models. Validation may also be used to determine if additional training is needed to improve a model. In cases where additional training is used after the initial validation, additional validation may be used after that training. In some cases, validation is followed by a final testing process.

"Validation Data" generally refers to data that is used in the process of validation for models. Typically, validation data is used for validation of artificial intelligence (AI) models. Validation data may be a subset of a larger data set that is used for other parts of developing AI models. For example, one initial data set may be divided into validation data and training data for developing an AI model. Validation data may include information that is used as input for a model and may include information about the expected output of a model. Models may be evaluated based on information from the validation data during the validation process.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 motion planning system
105 robot
110 camera
115 management system
120 network
125 material handling environment
130 robot arm
135 robotic shuttle
140 robotic mast vehicle
145 artificial intelligence system
200 picking station
205 end effector
210 item
215 tote
220 robot controller
225 robot camera
230 environment camera
235 camera controller
240 path
245 conveyor
250 picking tool
255 picking path
300 palletizer station
305 pallet
310 palletizer tool 315 palletizing path
400 trailer loading station
405 trailer
410 trailer loading tool
415 trailer loading path
500 controller
505 processor
510 memory
515 I/O device
520 network interface
605 processor
610 memory
615 long-term storage device
620 network interface
700 flowchart
705 stage
710 stage
715 stage
720 stage
725 stage
800 flowchart
805 stage
810 stage
815 stage
820 stage
900 flowchart
905 stage
910 stage
915 stage
920 stage
925 stage
930 stage

What is claimed is:

1. A system, comprising:
a camera configured to capture one or more images of a material handling environment;
wherein the material handling environment includes items;
a robot at least in part configured to move along a travel path relative to the items;
wherein the robot is configured to pick the items;
a management system configured to monitor the material handling environment through the images from the camera;
wherein the management system is configured to determine dynamically multiple picking solutions for the items in real-time while the robot moves along the travel path;
wherein the camera is mounted on the robot;
wherein the robot has an end effector;
wherein the robot is configured to move the end effector along the travel path;
wherein the camera is mounted proximal to or on the end effector to capture to the images while moving along the travel path;
wherein the robot is configured to move the end effector with the camera in an initial predefined path around the items to image an initial state of the items;
wherein the management system is configured to rank multiple picking location options for the items based on the images from the camera as the camera moves along the initial predefined path; and
wherein the management system is configured to change movement of the end effector from the initial predefined path to the travel path based on the rank.

2. The system of claim 1, wherein the movement of the robot is not pre-programmed.

3. The system of claim 1, wherein:

the material handling environment includes a tote in which the items are contained;

the items are arranged in a pile within the tote; and the robot is a robot arm.

4. The system of claim 3, wherein the travel path is shaped to ensure mechanical stability of the pile of the items once at least one of the items is removed from the pile.

5. The system of claim 1, wherein:

the material handling environment includes a trailer in which the items are housed; and the robot is a robotic mast vehicle that has a mast to move the items.

6. The system of claim 1, wherein the travel path has an irregular shape.

7. The system of claim 1, wherein the management system is configured to plan one or more picking locations of the items for the robot.

8. The system of claim 1, wherein the management system is configured to select a picking location option with highest rank.

9. The system of claim 1, wherein the rank includes relative visibility of each remaining item.

10. The system of claim 1, wherein the rank includes location of each remaining item relative to an ideal picking point.

11. The system of claim 1, wherein the rank includes location of each remaining item relative to a top of pile of items.

12. The system of claim 1, wherein the rank includes extent to which the visibility of each item is occluded by the remaining items.

13. The system of claim 1, wherein:

the management system includes an artificial intelligence (AI) system; and the AI system is configured to identify one or more pick points on the items.

14. The system of claim 13, wherein the AI system is configured to determine the travel path of the robot.

15. A method, comprising:

monitoring a material handling environment using a camera;

wherein the material handling environment includes items;

moving a camera for an end effector of a robot in an initial predefined path around the items to image an initial state of the items;

wherein the camera is mounted proximal to or on the end effector;

performing with a management system an initial rank of multiple initial picking location options for the items based on imaging from the camera as the camera moves along the initial predefined path;

changing movement of the end effector from the initial predefined path to a travel path based on the initial rank;

moving an end effector of a robot relative to the items along a travel path;

capturing images of the items with the camera while moving along the travel path;

processing the images from the camera with the management system;

ranking multiple picking solutions for the items with the management system;

selecting a target item based on the ranking;

changing the travel path of the end effector to pick the target item; and picking the target item with the end effector of the robot.

16. The method of claim 15, wherein the ranking includes determining relative visibility of each of the items.

17. The method of claim 15, wherein the ranking includes locating each the items relative to an ideal picking point.

18. The method of claim 15, wherein the ranking includes locating each of the items relative to a top of a pile of the items.

19. The method of claim 15, wherein the ranking includes determining visibility of each of the items.

\* \* \* \* \*